(12) United States Patent
Yamada et al.

(10) Patent No.: US 8,596,690 B2
(45) Date of Patent: Dec. 3, 2013

(54) QUICK CONNECTOR

(71) Applicant: Tokai Rubber Industries, Ltd., Aichi-ken (JP)

(72) Inventors: Hiroshi Yamada, Inabe (JP); Kazushige Sakazaki, Komaki (JP); Takahiro Shibata, Kitanagoya (JP); Ryo Ikegami, Chiryu (JP); Hisashi Terayama, Tsushima (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 0 days.

(21) Appl. No.: 13/759,124

(22) Filed: Feb. 5, 2013

(65) Prior Publication Data

US 2013/0147187 A1    Jun. 13, 2013

Related U.S. Application Data

(60) Division of application No. 13/340,845, filed on Dec. 30, 2011, now Pat. No. 8,408,604, which is a continuation of application No. PCT/JP2011/066463, filed on Jul. 20, 2011.

(30) Foreign Application Priority Data

Sep. 30, 2010 (JP) .................................. 2010-221223

(51) Int. Cl.
*F16L 39/00* (2006.01)

(52) U.S. Cl.
USPC ......................................... 285/319; 285/305

(58) Field of Classification Search
USPC .................................... 285/305, 39, 319, 307
See application file for complete search history.

(56) References Cited

U.S. PATENT DOCUMENTS

| | | | |
|---|---|---|---|
| 7,950,699 B2 | 5/2011 | Bauer et al. | |
| 2004/0036283 A1 | 2/2004 | Furuya | |
| 2005/0230968 A1 | 10/2005 | Takayanagi et al. | |
| 2007/0236012 A1 | 10/2007 | Kerin et al. | |

FOREIGN PATENT DOCUMENTS

| | | |
|---|---|---|
| JP | 2004-060884 | 2/2004 |
| JP | 2005/282762 | 10/2005 |
| JP | 2006-183833 | 7/2006 |
| JP | 2007-255668 | 10/2007 |
| JP | 2007-278508 | 10/2007 |
| JP | 2010-078077 | 4/2010 |

*Primary Examiner* — Aaron Dunwoody
(74) *Attorney, Agent, or Firm* — Greenblum & Bernstein P.L.C.

(57) ABSTRACT

A quick connector capable of surely confirming that a pipe body is engaged by a retainer when an elastically-deformable claw of the retainer and an elastically-deformable claw of a checker are adjacently arranged in an axial direction. Checker-axis direction elastically-deformable claws have distal-end sides formed flexibly deformable in the axial direction, maintain a state of being engaged by a second engagement portion of a retainer body by having deflective deformation regulated by a retainer diameter-expanding elastically-deformable claw in a state in which the retainer diameter-expanding elastically-deformable claw is expanded diametrically, and regulate sliding from a first position with respect to the retainer body toward a set radial direction by being engaged by the second engagement portion of the retainer body.

6 Claims, 28 Drawing Sheets

QUICK CONNECTOR

CLAIM OF PRIORITY AND CROSS-REFERENCE OF RELATED APPLICATIONS

The present application is a division of U.S. application Ser. No. 13/340,845, filed Dec. 30, 2011, which is a continuation of PCT/JP2011/066463, filed Jul. 20, 2011, and claims the priority benefit of Japanese Application No. 2010-221223, filed Sep. 30, 2010, the disclosures of which incorporated herein by reference in their entireties.

TECHNICAL FIELD

The present invention relates to a quick connector.

BACKGROUND ART

Quick connectors have been disclosed, for example, in Japanese Patent Laid-Open Publication No. 2005-282762 (Patent Document 1) and Japanese Patent Laid-Open Publication No. 2007-278508 (Patent Document 2). The quick connectors disclosed in these patent documents include a checker confirming whether a pipe body has been surely engaged with a retainer.

Operation up to when the checker confirms the engagement is as follows. When the pipe body is inserted through the retainer, an elastically-deformable claw of the retainer is expanded diametrically by an annular projection of the pipe body. Thereafter, when the annular projection of the pipe body passes through a location of the elastically-deformable claw of the retainer, the elastically-deformable claw restores its original shape, and the annular projection of the pipe body engages with the elastically-deformable claw of the retainer. On the other hand, an elastically-deformable claw of the checker is expanded diametrically by the annular projection of the pipe body that has passed through the location of the elastically-deformable claw of the retainer. The diameter expansion of the elastically-deformable claw of the checker allows the checker to become slidable. Then, by sliding the checker, it can be determined that the pipe body has been surely engaged with the retainer.

RELATED ART

[Patent Documents]

[Patent Document 1] Japanese Patent Laid-Open Publication No. 2005-282762

[Patent Document 2] Japanese Patent Laid-Open Publication No. 2007-278508

SUMMARY OF THE INVENTION

Problems to be Solved by the Invention

When the elastically-deformable claw of the retainer and the elastically-deformable claw of the checker are adjacently arranged in an axial direction, the annular projection of the pipe body may simultaneously expand diameters of both the elastically-deformable claw of the retainer and the elastically-deformable claw of the checker. When such an operation is performed, despite that the pipe body is not surely engaged by the retainer, the checker is in a slidable state. This problem may be solved by adjusting dimensions of each component and manufacturing with high precision. However, there is a problem that, along with miniaturization, higher precision is required in manufacturing. Further, the higher the manufacturing precision is, the higher the cost is.

The present invention is provided in view of such circumstances. An object of the present invention is to provide a quick connector capable of surely confirming that the pipe body is engaged by the retainer when the elastically-deformable claw of the retainer and the elastically-deformable claw of the checker are adjacently arranged in the axial direction.

Means for Solving the Problems

A quick connector according to the present invention is coupled to a cylindrical pipe body having an annular projection formed projecting radially outward at a location axially spaced a predetermined distance from a distal end. The quick connector includes: a cylindrical housing body; a retainer integrally formed with or coupled to the housing body, having a shape capable of allowing the pipe body to be inserted therethrough in an axial direction from an opening end of the retainer, and engaging the annular projection of the pipe body inserted into the retainer from the opening end in the axial direction to regulate disengagement of the pipe body in the axial direction; and a checker confirming that the annular projection of the pipe body is in a state of being engaged by the retainer by sliding in a set radial direction with respect to the retainer to move from a first position to a second position.

The retainer includes: a retainer body having a first engagement portion and a second engagement portion; and a retainer diameter-expanding elastically-deformable claw provided on the retainer body, having a C-shape capable of expanding diametrically by elastic deformation, allowing the annular projection of the pipe body to pass through in the axial direction by expanding diametrically, and engaging with the annular projection in the axial direction by restoring its original shape after the annular projection of the pipe body has passed through in the axial direction.

The checker includes: a checker diameter-expanding elastically-deformable claw formed in a C-shape capable of expanding diametrically by elastic deformation, regulating sliding with respect to the retainer body from the first position toward the set radial direction by being engaged by the first engagement portion not in a diameter-expanded state, being expanded diametrically by the annular projection of the pipe body after which has passed through the retainer diameter-expanding elastically-deformable claw in the axial direction, and being slidable with respect to the retainer body from the first position toward the second position in the set radial direction by being released from the engagement with the first engagement portion in a diameter-expanded state; and a checker-axis direction elastically-deformable claw having a distal-end side formed flexibly deformable in the axial direction, maintaining a state of being engaged by the second engagement portion of the retainer body by having the deflective deformation regulated by the retainer diameter-expanding elastically-deformable claw in a state in which the retainer diameter-expanding elastically-deformable claw is expanded diametrically, regulating sliding with respect to the retainer body from the first position toward the set radial direction by being engaged by the second engagement portion of the retainer body, and being slidable with respect to the retainer body from the first position to the second position in the set radial direction by being capable of being released from the engagement with the second engagement portion of the retainer body in a state in which the retainer diameter-expanding elastically-deformable claw has restored its original shape.

In the present invention, when the annular projection of the pipe body is located at the same axial location as the checker diameter-expanding elastically-deformable claw, the engagement with the first engagement portion of the retainer by the checker diameter-expanding elastically-deformable claw is released. However, even when the engagement with the first engagement of the retainer by the checker diameter-expanding elastically-deformable claw is released, unless the engagement with the second engagement portion of the retainer by the checker-axis direction elastically-deformable claw is in a releasable state, the checker cannot slide with respect to the retainer from the first position toward the set radial direction. That is, when the checker does not slide, it is determined that the pipe body is not engaged by the retainer.

In the present invention, in order for the engagement with the second engagement portion of the retainer by the checker-axis direction elastically-deformable claw to be in a releasable state, the retainer diameter-expanding elastically-deformable claw must restore its original shape. That is, in order for the checker to be in a state slidable from the first position toward the set radial direction, it is required to satisfy that (A) the checker diameter-expanding elastically-deformable claw is expanded diametrically by the annular projection of the pipe body and (B) the retainer diameter-expanding elastically-deformable claw restores its original shape.

Here, when the checker diameter-expanding elastically-deformable claw and the retainer diameter-expanding elastically-deformable claw are adjacent to each other in the axial direction, depending on design dimensions, it is possible that the annular projection of the pipe body simultaneously expands diameters of both the checker diameter-expanding elastically-deformable claw and the retainer diameter-expanding elastically-deformable claw. In this case, it is not yet in a state in which the annular projection of the pipe body is engaged by the retainer diameter-expanding elastically-deformable claw. In this case, the above (A) is satisfied, but the above (B) is not satisfied. Therefore, even when the situation as described above occurs in which both the diameter expansion elastically-deformable claws are expanded diametrically, the checker diameter-expanding elastically-deformable claw is in the state of being engaged with the second engagement portion of the retainer, and thus the checker cannot slide from the first position toward the set radial direction. That is, it can be confirmed that it is not yet in the state in which the annular projection of the pipe body is engaged by the retainer diameter-expanding elastically-deformable claw. In the state in which the annular projection of the pipe body is engaged by the retainer diameter-expanding elastically-deformable claw, the above conditions (A) and (B) are satisfied. Therefore, in the state in which the annular projection of the pipe body is engaged by the retainer diameter-expanding elastically-deformable claw, the checker can be surely slid in the set radial direction. As described above, according to the present invention, that the annular projection of the pipe body is engaged by the retainer diameter-expanding elastically-deformable claw can be surely confirmed.

Here, the axial direction corresponds to the axial direction of the portion of the pipe body that is inserted into the quick connector. The set radial direction along which the checker slides from the first position to the second position includes a case of a push-in direction of the checker with respect to the retainer and a case of a withdraw direction of the checker with respect to the retainer. In particular, in the case where the set radial direction is the push-in direction of the checker with respect to the retainer, the checker does not become an unnecessary part, and thus this has an effect that waste parts can be reduced. The retainer includes a case where the retainer is integrally formed with the housing body and a case of a configuration in which the retainer is separately formed and is coupled to the housing body. In particular, in the case where the retainer is integrally formed with the housing body, this has an effect that the number of parts can be reduced.

Further, in the present invention, the set radial direction along which the checker slides with respect to the retainer from the first position to the second position may be the push-in direction of the checker with respect to the retainer; an opening side of the C-shape of the retainer diameter-expanding elastically-deformable claw may be a direction opposite to the push-in direction; and the checker may have a release portion diametrically expanding the retainer diameter-expanding elastically-deformable claw by sliding with respect to the retainer from the second position to a third position in the set radial direction.

That is, by sliding the checker with respect to the retainer in the push-in direction, that the pipe body is engaged by the retainer can be confirmed. Then, further pushing in the checker from the second position leads to a state in which the pipe body can be withdrawn from the retainer. As just described, the checker is causing the retainer to perform a release operation. That is, the checker in the present invention performs the confirmation of the engagement of the pipe body and the release of the pipe body. This allows the quick connector as a whole to be simply configured without imposing complex features to the retainer.

Further, in the present invention, the quick connector may include a release regulation means regulating sliding of the checker toward the third position with respect to the retainer body in the state in which the checker is positioned at the second position with respect to the retainer body, and allowing the checker to be slidable with respect to the retainer body toward the third position when a force is applied.

As described above, in a configuration in which the checker performs the release of the pipe body by being slid with respect to the retainer further in the push-in direction from a position (the second position) for confirming the engagement of the pipe body by the checker, it is possible that the pipe body is put in a release state by interference due to surrounding parts and by accidentally over-pushing the checker by an operator.

However, by including the release regulation means, when the checker is positioned at the second position (engagement confirmation position), without applying a force to the release regulation means to release the regulation, the checker cannot slide to the third position (release position). Therefore, interference due to surrounding parts and accidentally sliding the checker toward the third position (release position) by an operator can be prevented.

Further, in the present invention, the retainer body or the housing body may include a third engagement portion as the release regulation means; and the checker may include a release elastically-deformable claw as the release regulation means. The release elastically-deformable claw regulates sliding of the checker toward the third position with respect to the retainer body by being engaged by the third engagement portion in a state in which the checker is positioned at the second position with respect to the retainer body, and allows the checker to be slidable toward the third position with respect to the retainer body by elastically deforming to release engagement with the third engagement portion.

In this case, by including the release elastically-deformable claw capable of engaging the third engagement portion of the retainer body or the housing body, when the checker is positioned at the second position (engagement confirmation position), the checker cannot slide to the third position (release position) unless the engagement of the release elastically-deformable claw with the third engagement portion is released. That is, by providing the third engagement portion that configures one part of the release regulation means on the retainer body or the housing body and by providing the release elastically-deformable claw that configures the other part of the release regulation means on the checker, interference due to surrounding parts and accidentally sliding the checker to the third position (release position) by an operator can be prevented without adding any new part.

Further, in the present invention, the release elastically-deformable claw may release engagement with the third engagement portion by elastically deforming in a direction different from the set radial direction along which the checker slides with respect to the retainer body. In this case, in order to perform release, it is necessary to apply a force in a direction different from the direction of the push-in movement of the checker. Therefore, interference due to surrounding parts and accidentally sliding the checker to the third position (release position) by an operator can be surely prevented.

Further, in the present invention, the release elastically-deformable claw may release engagement with the third engagement portion by elastically deforming in such a way as to rotate around a support point located at a base of the release elastically-deformable claw; a site of the release elastically-deformable claw in contact with the third engagement portion may form a sloped surface with respect to the set radial direction; and the sloped surface may be formed in such a way that a rotation direction of a moment about the support point generated by an engagement force received by the release elastically-deformable claw from the third engagement portion when the checker is pushed in in the set radial direction is opposite to a rotation direction for releasing the release elastically-deformable claw from engagement with the third engagement portion.

Even when a force is applied to the checker to push in the checker from the second position further toward the third position, the release elastically-deformable claw can be prevented from being elastically deformed by the force to release the engagement with the third engagement portion. Therefore, interference due to surrounding parts and accidentally sliding the checker to the third position (release position) by an operator can be surely prevented.

Further, in the present invention, the retainer body may include an open end seat member forming the opening end of the retainer and forming the second engagement portion; and the checker may include a gap intervening member formed on a radially inner side of the checker-axis direction elastically-deformable claw with a slit intervening therebetween, intervening in an axial gap between the open end seat member of the retainer body and the retainer diameter-expanding elastically-deformable claw during a period when the checker moves from the first position to the second position with respect to the retainer.

The gap intervening member can fill the space for the retainer diameter-expanding elastically-deformable claw to deform. Therefore, the retainer diameter-expanding elastically-deformable claw can be inhibited from deforming in the axial direction. As a result, in the state in which the annular projection of the pipe body is engaged by the retainer diameter-expanding elastically-deformable claw, a force for withdrawing the pipe body from the retainer can be increased. Further, a slit is provided between the gap intervening member and the checker-axis direction elastically-deformable claw. Therefore, regardless of whether elastic deformation of the gap intervening member is regulated, the checker-axis direction elastically-deformable claw is in an elastically-deformable state. Therefore, the above-described operation of the checker-axis direction elastically-deformable claw can be realized.

Further, in the present invention, the retainer and the checker may include a guide means regulating a relative rotation and guiding relative sliding in the set radial direction. This allows smoother sliding movement of the checker in the set radial direction.

Further, in the present invention, the checker-axis direction elastically-deformable claw may be a pair of checker-axis direction elastically-deformable claws respectively corresponding to two ends of the retainer diameter-expanding elastically-deformable claw. In this way, by providing the pair of the checker-axis direction elastically-deformable claws, the checker-axis direction elastically-deformable claws can surely perform their function.

Further, in the present invention, the retainer may be integrally formed with the housing body; and the retainer may include a stopper regulating diameter expansion of the retainer diameter-expanding elastically-deformable claw when amount of diameter expansion of the retainer diameter-expanding elastically-deformable claw has reached a set amount. This prevents the retainer diameter-expanding elastically-deformable claw from deforming more than necessary to plastically deform. Integrally forming the retainer and the housing body allows the stopper to be very easily formed.

MODE FOR CARRYING OUT THE INVENTION (First Embodiment)
(Quick Connector Overview)

Figure 1:
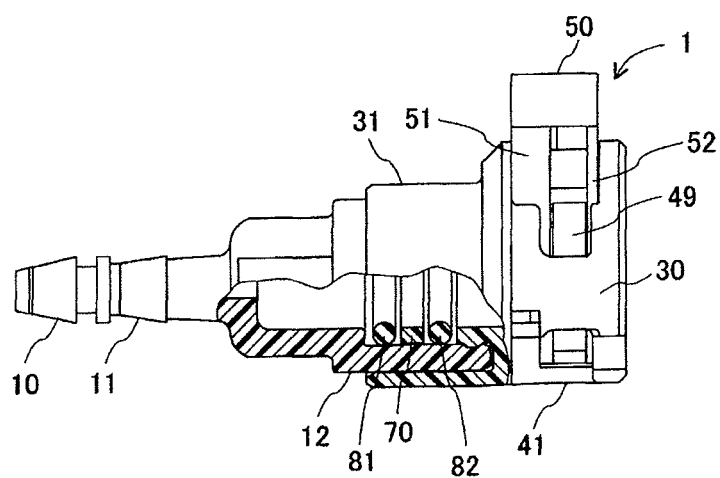
FIG. 1 is a front view (diagram viewed from a direction perpendicular to an axis) of a quick connector according to a first embodiment, in which a portion is illustrated as a cross-section view.

An overview of a quick connector 1 according to the present embodiment will be explained with reference to FIGS. 1-3. As FIG. 1 illustrates, the quick connector 1 is used, for example, for configuring a gasoline fuel piping of an automobile. That is, the quick connector 1 forms, for example, a flow path for fuel to pass through. One end (left side in FIGS. 1 and 2) of the quick connector 1 is connected to a resin tube (not shown in the drawings), and the other end of the quick connector 1 is coupled to a pipe body 3 (illustrated in FIG. 23), which is inserted into the other end of the quick connector 1. That is, the quick connector 1 provides a piping connection between the pipe body 3 and the resin tube to let gasoline fuel pass through. The pipe body 3 is formed in a cylindrical shape, and has an annular projection 3a (illustrated in FIG. 23) projecting radially outward at a location axially spaced a predetermined distance from a distal end. The quick connector 1 is configured to include a first housing 10, a second housing 30, a checker 50, a collar 70, and annular seal members 81 and 82.

The first housing 10 is made of, for example, glass fiber reinforced polyamide, and is formed in a cylindrical shape forming a through passage from one axial side to the other axial side. The first housing 10, as illustrated in FIGS. 1 and 2, has a shape forming a linear through passage. However, besides this, a flow path may also be formed, for example, as a through passage in a bent shape such as an "L-shape", an "inverted V-shape", and the like.

Figure 2:
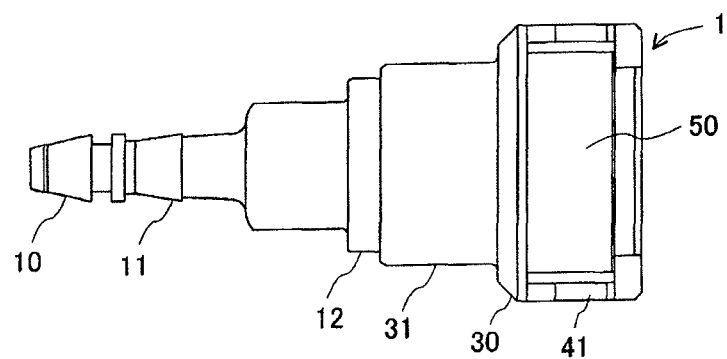
FIG. 2 is diagram (plain view) viewed from above in FIG. 1.
Figure 3:
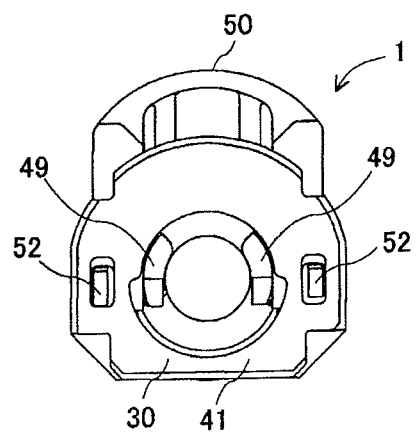
FIG. 3 is a diagram viewed from right in FIG. 1 (diagram viewed from an axial direction).

As FIGS. 1 and 2 illustrate, on one axial side (left side in FIGS. 1 and 2) of the first housing 10, a tube connecting portion 11 connecting a resin tube (not shown in the drawings) is provided. On the other hand, on the other axial side (right side in FIGS. 1 and 2) of the first housing 10, a pipe insertion portion 12 is provided, which is formed with an opening allowing the distal end of the pipe body 3 (illustrated in FIG. 23) to be inserted thereinto. An outer circumferential surface of the tube connecting portion 11 is formed in a step shape toward the axial direction for preventing the resin tube in an engaged state from being slipped off. Inside the tube connecting portion 11, a gasoline fuel flow path is formed as a through passage.

The pipe inserting portion 12 is formed in a cylindrical shape having a diameter larger than an outer diameter of the tube connecting portion 11, and is integrally formed on the other axial side (right side in FIGS. 1 and 2) of the tube connecting portion 11. On an inner periphery side of the pipe inserting portion 12, for example, the annular seal members 81 and 82, which are made of fluorine rubber, and the collar 70, which is made of resin, are arranged in a manner such that the collar 70 is sandwiched in the axial direction between the annular seal members 81 and 82. Into an inner periphery side of these, the distal end of the pipe body 3 is inserted.

As FIGS. 1 and 2 illustrate, the second housing 30 is made of, for example, glass fiber reinforced polyamide, and is formed in a nearly cylindrical shape. The second housing 30 is configured to include: a housing body 31 (which corresponds to a "housing body" of the present invention), which is coupled to the other axial side (right side in FIGS. 1 and 2) of the first housing 10; and a retainer 41 (which corresponds to a "retainer" of the present invention), which engages the annular projection 3a of the pipe body 3 (illustrated in FIG. 23). In the present embodiment, the housing body 31 and the retainer 41 are integrally formed. Details of the second housing 30 will be explained later in a separate section. Therefore, an overview of the second housing 30 is explained here.

The housing body 31 is a portion formed in a cylindrical shape, and is fitted to the other axial side (right side in FIGS. 1 and 2) of the first housing 10. The retainer 41 is integrally formed on the other axial side (right side in FIGS. 1 and 2) of the housing body 31. The retainer 41 is formed in a shape allowing the pipe body 3 (illustrated in FIG. 23) to be inserted therethrough from an open end portion (right end portion in FIGS. 1 and 2) of the retainer 41. Further, the retainer 41 engages the annular projection 3a of the pipe body 3 inserted from the open end portion of the retainer 41 to regulate disengagement of the pipe body 3.

The checker 50 is made of, for example, glass fiber reinforced polyamide, and is a member for confirming that the annular projection 3a of the pipe body 3 is in a state engaged by the retainer 41. Details of the checker 50 will be explained later in a separate section. Therefore, an overview of the checker 50 is explained here. The checker 50 is slid in a push-in direction (downward in FIGS. 1 and 20, which corresponds to a "set radial direction" in the present invention) with respect to the retainer 41 to move from a first position (position illustrated in FIGS. 20-22) with respect to the retainer 41 to a second position (position illustrated in FIGS. 32-34). The sliding operation confirms that the annular projection 3a of the pipe body 3 is in a state engaged by the retainer 41. Further, by sliding the checker 50 from the second position (position illustrated in FIGS. 32-34) with respect to the retainer 41 to a third position (position illustrated in FIGS. 35-37) positioned in the push-in direction (downward in FIGS. 1 and 20), the annular projection 3a of the pipe body 3 is released from the engagement with the retainer 41.

That is, the quick connector 1 according to the present embodiment is of a retainer-housing integrated type and of a checker-push type. Further, the checker 50 of the quick connector 1, having a release feature, is of a push-release type. In the following, detailed configurations of the second housing 30 and the checker 50 will be explained. Further thereafter, each of processes will be explained including beginning to insert the pipe body 3 into the quick connector 1, coupling the pipe body 3 to the quick connector 1, and releasing the pipe body 3 from the quick connector 1. Unless otherwise noted, in the following explanation, a side on which the checker 50 is mounted with respect to the retainer 41 is an upper side. That is, in the explanation, the checker 50 is slid from the upper side to the lower side with respect to the retainer 41, in engagement confirmation and push-release by the checker 50.

(Detailed Configuration of the Second Housing)

Figure 4:
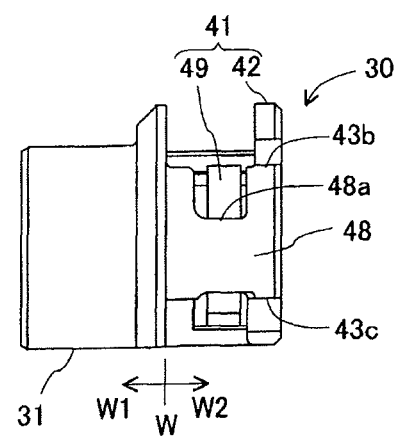
FIG. 4 is a front view (diagram viewed from a direction perpendicular to the axis) of a second housing configuring the quick connector in FIG. 1.

The detailed configuration of the second housing 30 will be explained with reference to FIGS. 4-12. As explained in the above "Quick Connector Overview" section, the second housing 30 is configured to include the housing body 31 and the retainer 41. Incidentally, since the housing body 31 and the retainer 41 are integrally formed, there is not a strict boundary therebetween. However, in the explanation here, an axial location W in FIG. 4 is used as a boundary. The housing body 31 is provided as a portion W1 on the left side of the axial location W in FIG. 4 (one axial side), and the retainer 41 is provided as a portion W2 on the right side of the axial location W in FIG. 4 (other axial side).

Figure 5:
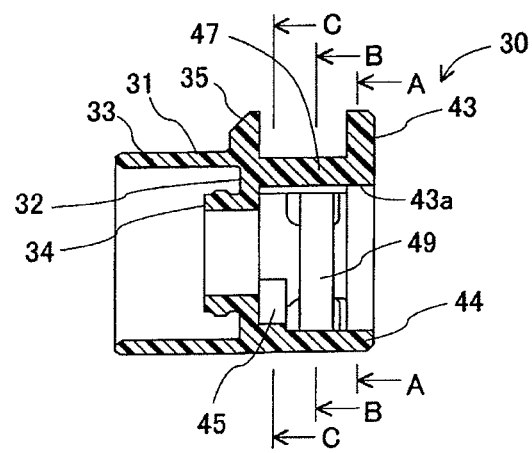
FIG. 5 is an axial cross-section view of the second housing.

As FIG. 5 illustrates, the housing body 31 is formed in a cylindrical shape, and has a groove 32 formed over the whole circumference, which opens toward the one axial side (left side in FIG. 5). The axial length of an outer periphery cylindrical portion 33 of the groove 32 is formed longer than the axial length of an inner periphery cylindrical portion 34 of the groove 32. As FIG. 1 illustrates, the portion of the other axial side (right side in FIG. 1) of the first housing 10 is fitted into the groove 32. That is, the inner periphery cylindrical portion 34 of the housing body 31 positions the collar 70 and the annular seal members 81 and 82 in the axial direction. Further, as FIGS. 4 and 5 illustrate, a flange 35 projecting radially outward is formed at the other axial side (right side in FIGS. 4 and 5) of the housing body 31 on the periphery excluding a bottom portion in FIGS. 10 and 11.

The retainer 41 is integrally formed on the other axial side (right side in FIGS. 4 and 5) of the housing body 31 and has a central hole formed for inserting the pipe body 3 therethrough. The retainer 41 is configured to include a retainer body 42 and a retainer diameter-expanding elastically-deformable claw 49. The retainer body 42 is integrally formed with the housing body 31, and is a portion that does not deform, in a sense to be distinguished from the retainer diameter-expanding elastically-deformable claw 49.

Figure 9:
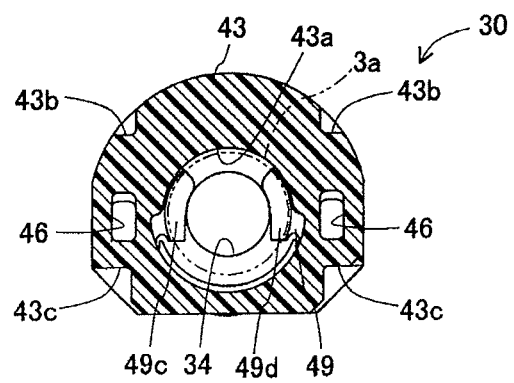
FIG. 9 is a cross-section view along a line A-A in FIG. 5.

The retainer body 42 includes an open end seat member 43, a lower joining member 44, a first engagement portion 45, a second engagement portion 46, a guide portion 47, and a stopper 48. As FIGS. 4-6 and 9 illustrate, the open end seat member 43 is formed having a nearly identical outer shape and axial width as the flange 35 of the housing body 31. The open end seat member 43 is coaxially arranged at the other axial side to face the flange 35 of the housing body 31 at a distance therefrom. Further, as FIGS. 5 and 9 illustrate, in the open end seat member 43, a central hole 43a is formed having dimensions capable of allowing the annular projection 3a of the pipe body 3 to pass through.

Figure 6:
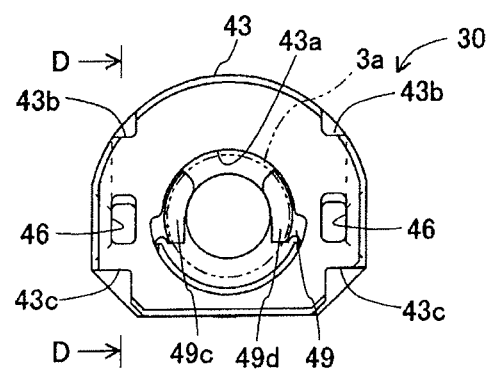
FIG. 6 is a right side view in FIG. 4.
Figure 7:
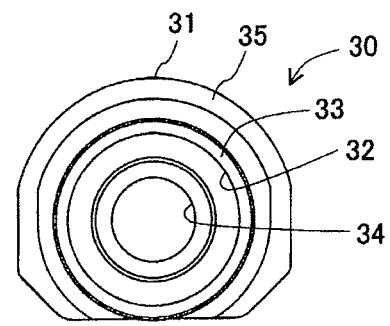
FIG. 7 is a left side view in FIG. 4.
Figure 12:
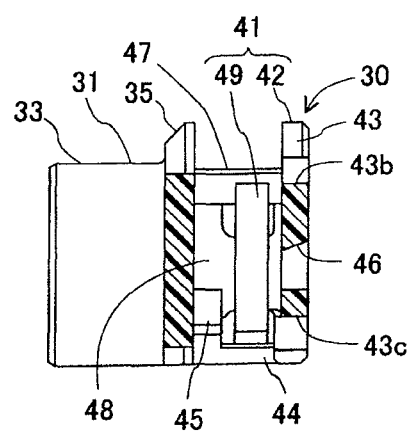
FIG. 12 is a cross-section view along a line D-D in FIG. 6.

Further, as FIGS. 6 and 9 illustrate, when the open end seat member 43 is viewed from the axial direction, each of a pair of engagement holes (referred to as the "second engagement portions 46" in the following) as the second engagement portion 46 is formed on respective left and right sides of the central hole 43a in FIG. 9. As FIG. 12 illustrates, the pair of the second engagement portions 46 and 46 are formed as through holes in the axial direction. In more detail, upper surfaces of the pair of the second engagement portions 46 and 46 are formed with a slope rising in a direction from the left side to the right side in FIG. 12. While an explanation will be provided later with reference to FIG. 20, this is for engaging distal-end projections 52a and 52b of checker-axis direction elastically-deformable claws 52 and 52 of the checker 50 in an initial state.

Further, as FIGS. 6 and 9 illustrate, a pair of upper cutouts 43b and 43b forming plane seats are respectively formed above the pair of the second engagement portions 46 and 46 on the outer periphery surface of the open end seat member 43. The pair of the upper cutouts 43b and 43b are for performing initial positioning of the checker-axis direction elastically-deformable claws 52 and 52 in order to achieve the initial state illustrated in FIG. 21. Details will be described later. That is, the pair of the upper cutouts 43b and 43b are cutouts for enabling easy installation of the checker 50 with respect to the retainer 41.

Figure 33:
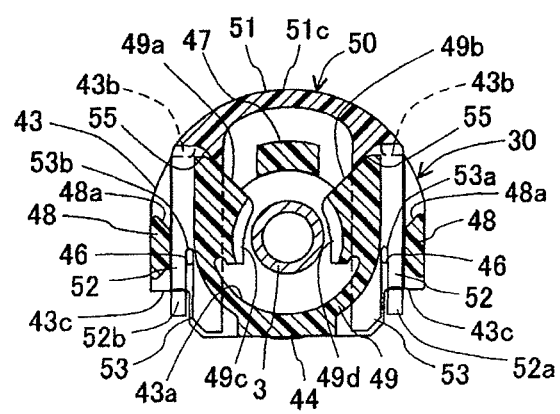
FIG. 33 (illustrating the engagement confirmation completion state) is a cross-section view along a line L1-L1 in FIG. 32, illustrating a state in which the retainer diameter-expanding elastically-deformable claw is not expanded diametrically.

Further, as FIGS. 6 and 9 illustrate, a pair of lower cutouts 43c and 43c forming plane seats are respectively formed below the pair of the second engagement portions 46 and 46 on the outer periphery surface of the open end seat member 43. The pair of the lower cutouts 43c and 43c are for performing positioning of the checker-axis direction elastically-deformable claws 52 and 52 in an engagement confirmation completion state as illustrated in FIG. 33. Details will be described later.

Figure 10:
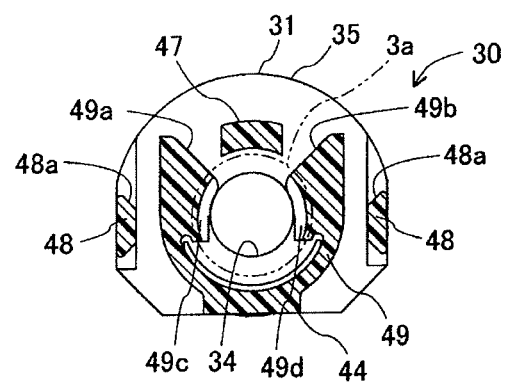
FIG. 10 is a cross-section view along a line B-B in FIG. 5.
Figure 11:
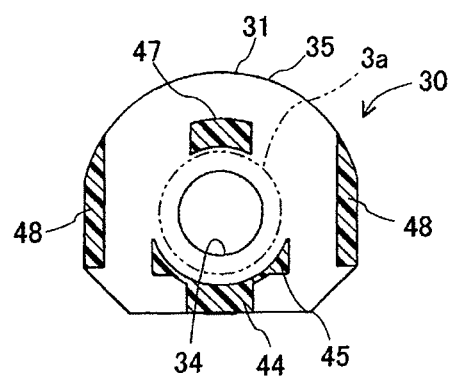
FIG. 11 is a cross-section view along a line C-C in FIG. 5.

As FIGS. 5, 10 and 11 illustrate, the lower joining member 44 is a portion joining in the axial direction the lower portion of the other axial side surface (right side surface in FIG. 5) of the housing body 31 and the lower portion of the open end seat member 44.

As FIG. 11 illustrates, the first engagement portion 45 is formed in a semi-circular shape opening upward. The first engagement portion 45 is provided above the lower joining member 44 as illustrated in FIG. 11, on the housing body 31 side as illustrated in FIG. 5. The first engagement portion 45 is provided at a location that does not interfere with the annular projection 3a of the pipe body 3 indicated by the two-dot chain line in FIG. 11. Two ends of the first engagement portion 45 are formed in an acute angular shape, and the left and right sides of the first engagement portion 45 in FIG. 11 are formed as vertical planes.

As FIGS. 5, 8, 10 and 11 illustrate, the guide portion 47 joins the upper side of the flange 35 of the housing body 31 and the upper side of the open end seat member 43. The guide portion 47 is provided at a location that does not interfere with the annular projection 3a of the pipe body 3 indicated by the two-dot chain line in FIG. 11.

As FIGS. 4, 10 and 11 illustrate, a pair of stoppers 48 and 48 respectively join two lateral locations (left and right sides in FIGS. 10 and 11) of the central hole of the flange 35 of the housing body 31 and two lateral locations of the central hole 43a of the open end seat member 43. The pair of the stoppers 48 and 48 are provided at locations that do not interfere with the annular projection 3a of the pipe body 3 indicated by the two-dot chain line in FIG. 11. Further, as FIG. 4 illustrates, on an upper side of an axial central portion of the pair of the stoppers 48 and 48, a cutout 48a is formed. In a first intermediate state illustrated in FIG. 24, the cutout 48a allows diameter expansion of the retainer diameter-expanding elastically-deformable claw 49, and also has a function to regulate the diameter expansion of the retainer diameter-expanding elastically-deformable claw 49 in a case where amount of the diameter expansion has reached a set amount. Details will be described later.

As FIG. 10 illustrates, the retainer diameter-expanding elastically-deformable claw 49 is formed in a C shape opening upward. The retainer diameter-expanding elastically-deformable claw 49 is diametrically expandable by elastic deformation. The retainer diameter-expanding elastically-deformable claw 49 is provided above the lower joining member 44 as illustrated in FIG. 10, at approximately a central region in the axial direction as illustrated in FIG. 5. That is, the retainer diameter-expanding elastically-deformable claw 49 is provided in the axial direction between the open end seat member 43 and the first engagement portion 45. As FIG. 10 illustrates, in a not diameter-expanded state, the retainer diameter-expanding elastically-deformable claw 49 is provided at a location interfering with the annular projection 3a of the pipe body 3 indicated by the two-dot chain line in FIG. 10. However, the retainer diameter-expanding elastically-deformable claw 49 allows the annular projection 3a of the pipe body 3 to pass therethrough by expanding diametrically. That is, after the annular projection 3a of the pipe body 3 passed through the axial location of the retainer diameter-expanding elastically-deformable claw 49, the retainer diameter-expanding elastically-deformable claw 49 restores its original shape, and thereby the retainer diameter-expanding elastically-deformable claw 49 functions to engage in the axial direction the annular projection 3a of the pipe body 3.

Figure 8:
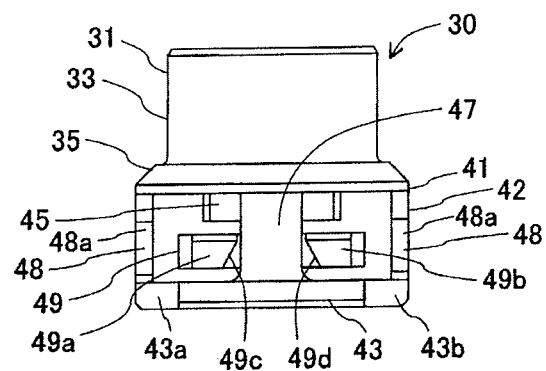
FIG. 8 is diagram (plain view) viewed from above in FIG. 6.

Further, as FIG. 10 illustrates, distal-end surfaces 49a and 49b of the retainer diameter-expanding elastically-deformable claw 49 are formed sloping downward towards inner side. This is for causing the retainer diameter-expanding elastically-deformable claw 49 to expand diametrically when the distal-end surfaces 49a and 49b of the retainer diameter-expanding elastically-deformable claw 49 are pressed by release portions 55 and 55. Further, as FIG. 8 illustrates, end surfaces 49c and 49d on the other axial side of the distal-end side of the retainer diameter-expanding elastically-deformable claw 49 are formed into a slope shape tapering from the other axial side (pipe body 3 insertion side) to the one axial side (resin tube connection side). As described above, the retainer diameter-expanding elastically-deformable claw 49 not in the diameter-expanded state interferes with the annular projection 3a of the pipe body 3. Therefore, in order for the annular projection 3a of the pipe body 3 to pass through the retainer diameter-expanding elastically-deformable claw 49, it is necessary for the annular projection 3a of the pipe body 3 to diametrically expand the retainer diameter-expanding elastically-deformable claw 49. Forming the end surfaces 49c and 49d into a slope allows easy diameter expansion when the annular projection 3a of the pipe body 3 passes through the retainer diameter-expanding elastically-deformable claw 49.

(Detailed Configuration of the Checker)

Next, the detailed configuration of the checker 50 will be explained with reference to FIGS. 13-19. As explained in the above "Quick Connector Overview" section, the checker 50 is a member for confirming that the annular projection 3a of the pipe body 3 is in the state engaged by the retainer 41. The checker 50 is configured to include a checker diameter-expanding elastically-deformable claw 51, a checker-axis direction elastically-deformable claw 52, a gap intervening member 53, a guide portion 54, and a release portion 55.

Figure 15:
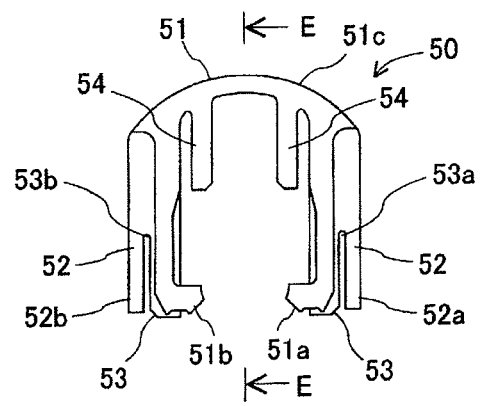
FIG. 15 is a left side view in FIG. 13.
Figure 16:
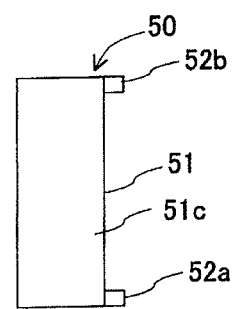
FIG. 16 is diagram (plain view) viewed from above in FIG. 13.
Figure 17:
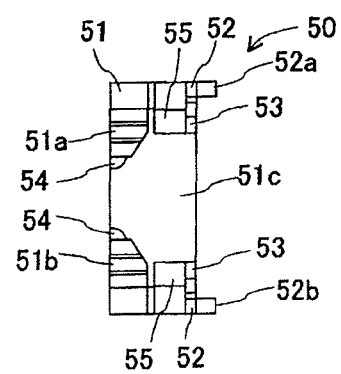
FIG. 17 is diagram (bottom view) viewed from below in FIG. 13.

As FIG. 15 illustrates, the checker diameter-expanding elastically-deformable claw 51 is formed in a C-shape capable of expanding diametrically by elastic deformation. On the two distal ends of the checker diameter elastically-deformable claw 51, projections 51a and 51b are formed projecting toward the inner side. While details will be explained later, by being engaged by the first engagement portion 45 not in a diameter-expanded state, the checker diameter-expanding elastically-deformable claw 51 is regulated from sliding with respect to the retainer body 42 from the first position (position illustrated in FIGS. 20-22) toward a downward direction (set radial direction). The checker diameter-expanding elastically-deformable claw 51 is expanded diametrically by the annular projection 3a of the pipe body 3 that has passed through the retainer diameter-expanding elastically-deformable claw 49. In a diameter-expanded state, the checker diameter-expanding elastically-deformable claw 51 is released from the engagement with the first engagement portion 45 and is in a state capable of sliding with respect to the retainer body 42 from the first position (position illustrated in FIGS. 20-22) toward the second position (position illustrated in FIGS. 32-34) in the downward direction (set radial direction).

The pair of the checker-axis direction elastically-deformable claws 52 and 52 are provided on a base portion 51c of the checker diameter-expanding elastically-deformable claw 51. The pair of the checker-axis direction elastically-deformable claws 52 and 52 are provided spaced a distance away from the checker diameter-expanding elastically-deformable claw 51 in the left-right direction in FIG. 13. Distal-end sides of the checker-axis direction elastically-deformable claws 52 and 52 are formed capable of flexibly deforming in the left-right direction in FIG. 13 (corresponding to the axial direction in FIG. 1). On distal ends of the checker-axis direction elastically-deformable claws 52 and 52, projections 52a and 52b are formed projecting toward the right side in FIG. 13.

While details will be explained later, in the state in which the retainer diameter-expanding elastically-deformable claw 49 is not expanded diametrically, the checker-axis direction elastically-deformable claws 52 and 52 maintain a state of being engaged by the second engagement portion 46 of the retainer body 42 by having deflective deformation being regulated by the retainer diameter-expanding elastically-deformable claw 49. Further, by being engaged by the second engagement portion 46 of the retainer body 42, the checker-axis direction elastically-deformable claws 52 and 52 are regulated from sliding with respect to the retainer body 42 from the first position (position illustrated in FIGS. 20-22) toward the downward direction (set radial direction). Further, in the state in which the retainer diameter-expanding elastically-deformable claw 49 has restored its original shape, the checker-axis direction elastically-deformable claws 52 and 52 are in a state of capable of being released from engagement with the second engagement portion 46 of the retainer body 42, and thereby are in a state capable of sliding with respect to the retainer body 42 from the first position (position illustrated in FIGS. 20-22) toward the second position (position illustrated in FIGS. 32-34) in the downward direction (set radial direction).

Figure 14:
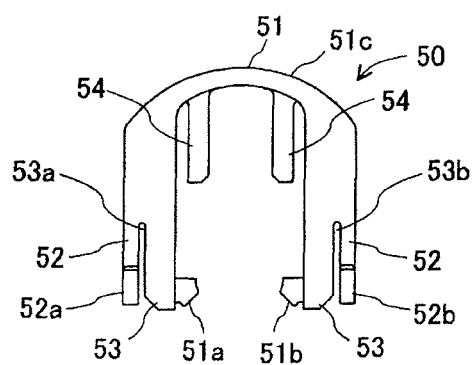
FIG. 14 is a right side view in FIG. 13.

As FIG. 14 illustrates, the pair of the gap intervening members 53 and 53 are respectively formed on the radially inner side of the checker-axis direction elastically-deformable claws 52 and 52 with slits 53a and 53b intervening therebetween. While details will be explained later, the pair of the gap intervening members 53 and 53 intervene in the axial gaps between the open end seat member 43 of the retainer body 42 and the retainer diameter-expanding elastically-deformable claw 49 during a period when the checker 50 moves with respect to the retainer 41 from the first position (position illustrated in FIGS. 20-22) to the second position (position illustrated in FIGS. 32-34).

As FIG. 15 illustrates, the guide portions 54 and 54 are provided on the base portion 51c of the checker diameter-expanding elastically-deformable claw 51, and are formed on the inner side of the C-shape of the checker diameter-expanding elastically-deformable claw 51. These guide portions 54 and 54 are formed spaced at a distance corresponding to the width of the guide portion 47 of the retainer 41. By engaging with the guide portion 47 of the retainer 41, the guide portions 54 and 54 of the checker 50 regulate relative rotation between the retainer 41 and the checker 50, and have a function of guiding the relative sliding movement in the up-down direction.

Figure 13:
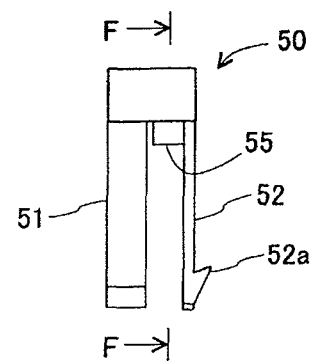
FIG. 13 is a front view (diagram viewed from a direction perpendicular to the axis) of a checker configuring the quick connector in FIG. 1.
Figure 18:
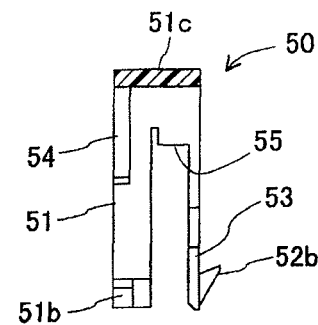
FIG. 18 is a cross-section view along a line E-E in FIG. 15.
Figure 19:
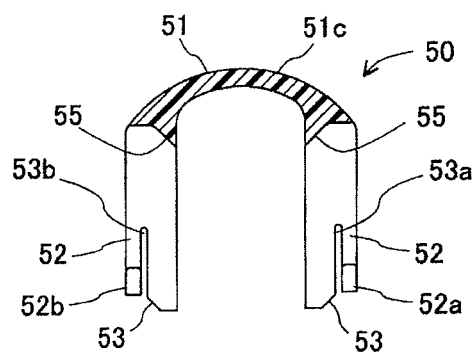
FIG. 19 is a cross-section view along a line F-F in FIG. 13.

As FIGS. 13 and 18 illustrate, the release portions 55 and 55 are provided on the base portion 51c of the checker diameter-expanding elastically-deformable claw 51, and are formed in the axial direction between the checker-axis direction elastically-deformable claw 52 and the guide portion 54. As FIG. 19 illustrates, the release portions 55 and 55 are formed inclining from the inner side towards the outer side. The release portions 55 and 55 are formed in a shape corresponding to the slope shape of the distal-end surfaces 49a and 49b of the retainer diameter-expanding elastically-deformable claw 49. While details will be explained later, when the checker 50 slides with respect to the retainer 41 from the second position (position illustrated in FIGS. 32-34) to the third position (position illustrated in FIGS. 35-37) in the downward direction (set radial direction), the release portions 55 and 55 diametrically expand the retainer diameter-expanding elastically-deformable claw 49.

(Explanation of Pipe Body Insertion Process, Engagement Confirmation Process and Pipe Body Release Process)

Next, operation of each component of the quick connector 1 will be explained in a process in which the pipe body 3 is inserted into the above-described quick connector. Thereafter, operation of each component of the quick connector 1 will be explained in a process in which the pipe body 3 is released from the quick connector.

(Initial State (Process before Pipe Body Insertion))

Figure 20:
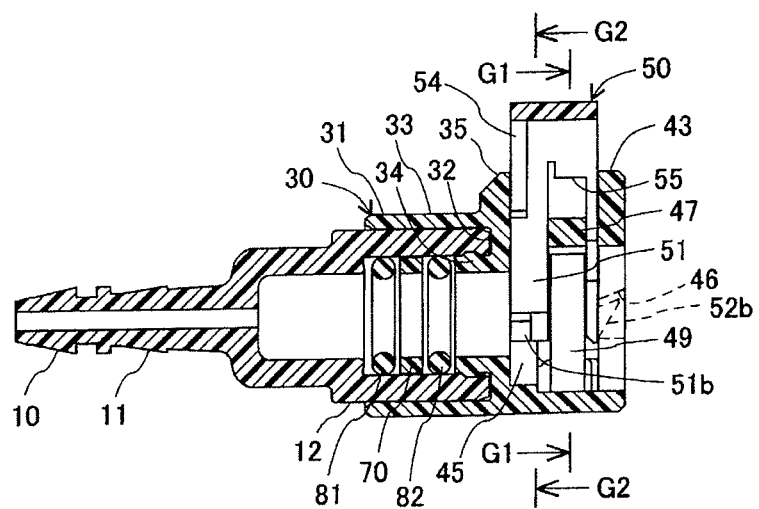
FIG. 20 (illustrating an initial state) is an axial cross-section view of the quick connector in a state in which the checker is positioned at a first position, which is a state before a pipe body is inserted into the quick connector.
Figure 21:
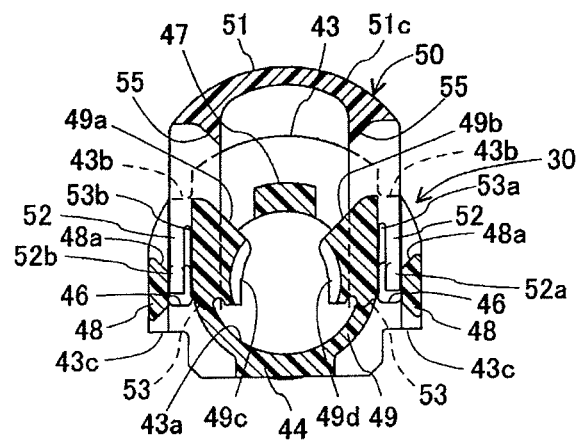
FIG. 21 (illustrating the initial state) is a cross-section view along a line G1-G1 in FIG. 20, illustrating a state in which a retainer diameter-expanding elastically-deformable claw is not expanded diametrically.
Figure 22:
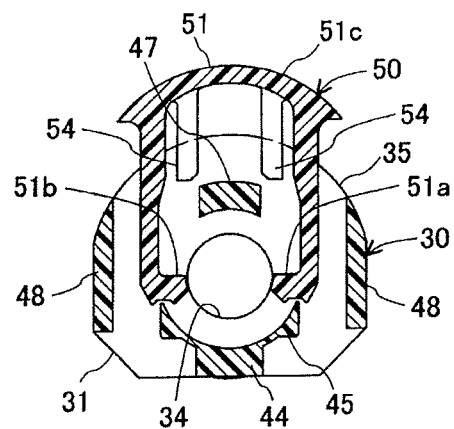
FIG. 22 (illustrating the initial state) is a cross-section view along a line G2-G2 in FIG. 20, illustrating a state in which a checker diameter-expanding elastically-deformable claw is not expanded diametrically.

First, an initial state, which is a process before the pipe body 3 is inserted into the quick connector 1, will be explained with reference to FIGS. 20-22. As FIGS. 20-22 illustrate, the initial state is a state in which the checker 50 is positioned at the first position with respect to the retainer 41. Specifically, as FIG. 20 illustrates, the checker 50 is installed from above the retainer 41. Here the "above the retainer 41" corresponds to the opening side of the retainer diameter-expanding elastically-deformable claw 49.

More specifically, the distal-end side of the checker diameter-expanding elastically-deformable claw 51 is inserted into the axial gap between the flange 35 of the housing body 31 and the retainer diameter-expanding elastically-deformable claw 49. In this case, as FIG. 22 illustrates, the distal end of the first engagement portion 45 of the retainer 41 is positioned further beyond the distal ends (lower side in FIG. 21) of the distal-end projections 51a and 51b of the checker diameter-expanding elastically-deformable claw 51. Therefore, the checker diameter-expanding elastically-deformable claw 51 is regulated from sliding further downward.

Further, as FIGS. 20 and 21 illustrate, in the initial state, the gap intervening members 53 and 53 are inserted in the axial gaps between the open end seat member 43 of the retainer 41 and the retainer diameter-expanding elastically-deformable claw 49. In this case, as illustrated by the dashed line in FIG. 20, the distal-end projections 52a and 52b of the checker-axis direction elastically-deformable claws 52 and 52 are in a state of having entered into the second engagement portions 46 and 46 of the open end seat member 43 of the retainer 41. Therefore, since the distal-end projections 52a and 52b of the checker-axis direction elastically-deformable claws 52 and 52 are in the state of having been inserted into the second engagement portions 46 and 46, the checker 50 can be prevented from disengaging from the retainer 41. In particular, the engagement involves acute angles, and is thus more effective.

(First Intermediate State (Pipe Body Insertion Process))

Figure 23:
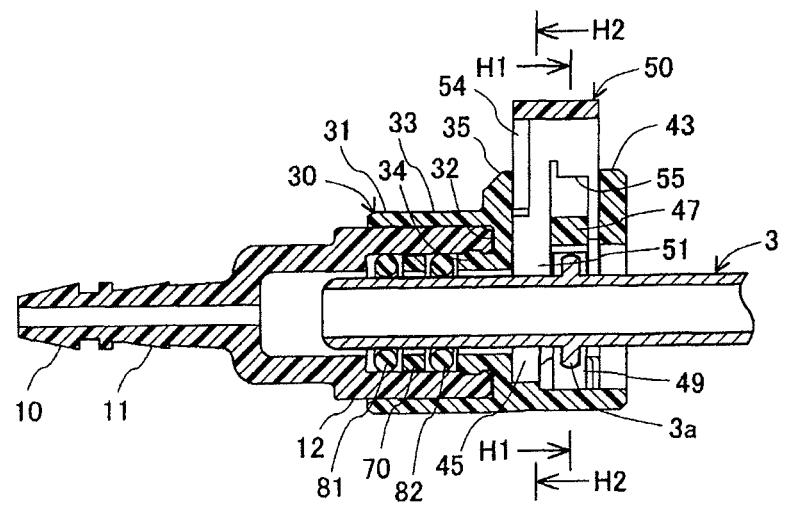
FIG. 23 (illustrating a first intermediate state) is an axial cross-section view of the quick connector in a state in which a portion of the pipe body is inserted into the quick connector. The checker is positioned at the first position.
Figure 24:
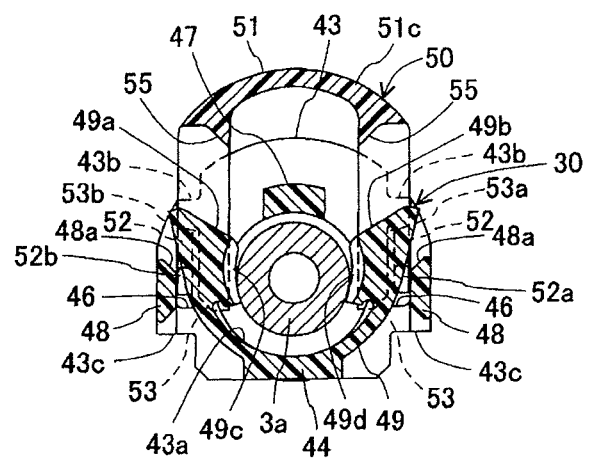
FIG. 24 (illustrating the first intermediate state) is a cross-section view along a line H1-H1 in FIG. 23, illustrating a state in which the retainer diameter-expanding elastically-deformable claw is expanded diametrically.

Next, a first intermediate state, which is a state in which a portion of the distal end of the pipe body 3 has been inserted from the open end seat member 43 side of the quick connector 1, is explained with reference to FIGS. 23-25. As FIG. 23 illustrates, the pipe body 3 is formed in a cylindrical shape, and has the annular projection 3a (illustrated in FIG. 23) formed projecting radially outward at a location axially spaced a predetermined distance from the distal end. When the pipe body 3 is inserted from the open end seat member 43 side of the quick connector 1, the annular projection 3a interferes with the retainer diameter-expanding elastically-deformable claw 49. Therefore, as FIG. 24 illustrates, the annular projection 3a of the pipe body 3 causes the retainer diameter-expanding elastically-deformable claw 49 to elastically deform to expand diametrically. In particular, the annular projection 3a of the pipe body 3 presses against the end surfaces 49c and 49d on the other axial side on the distal-end side of the retainer diameter-expanding elastically-deformable claw 49. Therefore, the retainer diameter-expanding elastically-deformable claw 49 relatively easily expands diametrically.

Here, on the one axial side (insertion direction of the pipe body 3) of the retainer diameter-expanding elastically-deformable claw 49, the checker diameter-expanding elastically-deformable claw 51 is positioned. Therefore, although the retainer diameter-expanding elastically-deformable claw 49 is axially pressed against by the annular projection 3a of the pipe body 3, the retainer diameter-expanding elastically-deformable claw 49 is inhibited from being axially deformed by the checker diameter-expanding elastically-deformable claw 51. This also allows the retainer diameter-expanding elastically-deformable claw 49 to relative easily expand diametrically.

As FIG. 24 illustrates, by diametrically expanding the retainer diameter-expanding elastically-deformable claw 49, the annular projection 3a of the pipe body 3 can pass through the location of the retainer diameter-expanding elastically-deformable claw 49. Here, in the retainer 41, the stoppers 48 and 48 are formed. When the retainer diameter-expanding elastically-deformable claw 49 expands diametrically, the stoppers 48 and 48 regulate the amount of the diameter expansion so as to not exceed a set amount. Therefore, when in contact with the stoppers 48 and 48, the retainer diameter-expanding elastically-deformable claw 49 stops further expanding diametrically.

Figure 25:
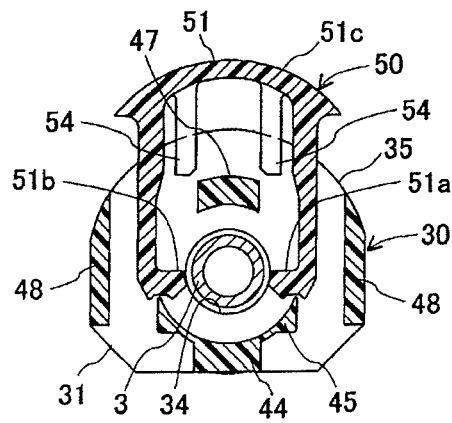
FIG. 25 (illustrating the first intermediate state) is a cross-section view along a line H2-H2 in FIG. 23, illustrating a state in which the checker diameter-expanding elastically-deformable claw is not expanded diametrically.

As FIG. 25 illustrates, when the retainer diameter-expanding elastically-deformable claw 49 performs the above operation, the checker diameter-expanding elastically-deformable claw 51 does not expand diametrically. That is, the distal-end projections 51a and 51b of the checker diameter-expanding elastically-deformable claw 51 are regulated from sliding downward by the first engagement portion 45 of the retainer 41.

In this case, as FIG. 24 illustrates, the pair of the checker-axis direction elastically-deformable claws 52 and 52 are in a state of being sandwiched between the retainer diameter-expanding elastically-deformable claw 49 in a diameter-expanded state and the open end seat member 43. That is, the checker-axis direction elastically-deformable claws 52 and 52 are in a state of being regulated from flexibly deforming in the axial direction. Here, in order for the checker-axis direction elastically-deformable claws 52 and 52 to be disengaged from the second engagement portion 46 of the retainer 41, the checker-axis direction elastically-deformable claws 52 and 52 must flexibly deform in the axial direction. However, as described above, the checker-axis direction elastically-deformable claws 52 and 52 are in the state of being regulated from flexibly deforming in the axial direction. Therefore, the checker-axis direction elastically-deformable claws 52 and 52 are also regulated from sliding downward with respect to the retainer 41.

Figure 28:
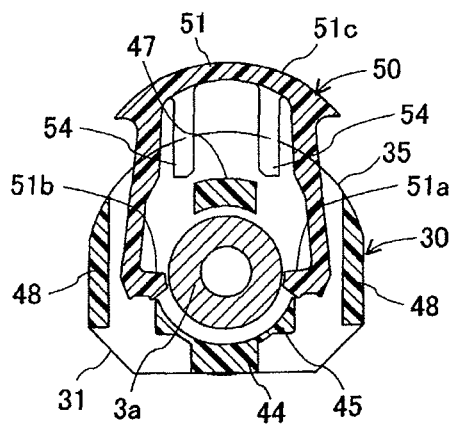
FIG. 28 (illustrating the second intermediate state) is a cross-section view along a line J2-J2 in FIG. 26, illustrating a state in which the checker diameter-expanding elastically-deformable claw is expanded diametrically.

Incidentally, the checker diameter-expanding elastically-deformable claw 51 is arranged in the axial direction adjacent to the retainer diameter-expanding elastically-deformable claw 49. Therefore, a situation may occur in which the annular projection 3a of the pipe body 3 expands diameters of both the retainer diameter-expanding elastically-deformable claw 49 and the checker diameter-expanding elastically-deformable claw 51. In this case, as FIG. 28 illustrates, as a second intermediate state to be explained later, the checker diameter-expanding elastically-deformable claw 51 expands diametrically. Then, the distal-end projections 51a and 51b of the checker diameter-expanding elastically-deformable claw 51 disengage from the location of the first engagement portion 45 of the retainer 41. That is, the checker diameter-expanding elastically-deformable claw 51 is in a state capable of sliding downward without being engaged by the first engagement portion 45.

However, in the first intermediate state, even when the checker diameter-expanding elastically-deformable claw 51 has been expanded diametrically, the checker-axis direction elastically-deformable claws 52 and 52 are regulated from sliding downward. Therefore, in the state in which the annular projection 3a of the pipe body 3 expands the diameter of the retainer diameter-expanding elastically-deformable claw 49, the checker 50 cannot slide downward.

(Second Intermediate State (Pipe Insertion Process))

Figure 26:
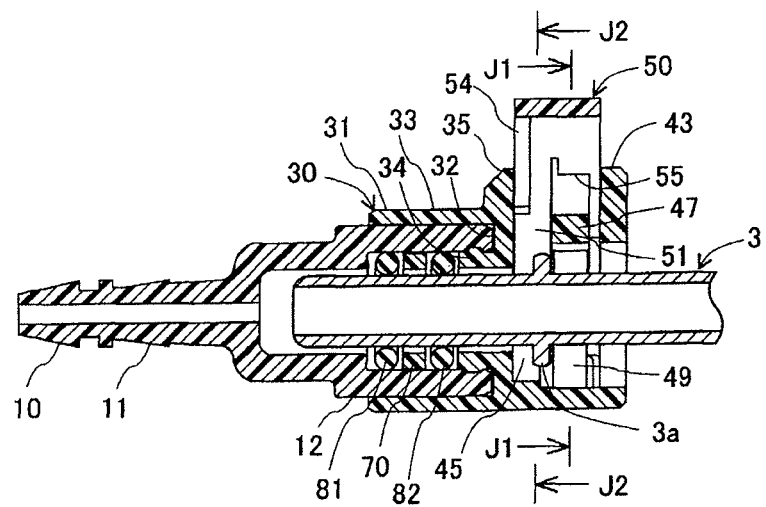
FIG. 26 (illustrating a second intermediate state) is an axial cross-section view of the quick connector in a state in which the pipe body is inserted into the quick connector further than the state of FIG. 23. The checker is positioned at the first position.
Figure 27:
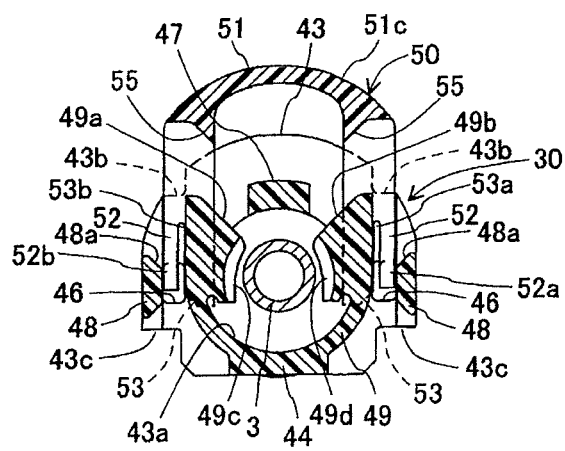
FIG. 27 (illustrating the second intermediate state) is a cross-section view along a line J1-J1 in FIG. 26, illustrating a state in which the retainer diameter-expanding elastically-deformable claw is not expanded diametrically.

Next, a second intermediate state, which is a state in which a portion of the distal end of the pipe body 3 has been further inserted, will be explained with reference to FIGS. 26-28. As FIG. 26 illustrates, the annular projection 3a of the pipe body 3 passes through the location of the retainer diameter-expanding elastically-deformable claw 49. Then, as FIG. 27 illustrates, the retainer diameter-expanding elastically-deformable claw 49 restores its original shape, and thereby the retainer diameter-expanding elastically-deformable claw 49 engages in the axial direction the annular projection 3a of the pipe body 3.

In this case, as FIG. 26 illustrates, the annular projection 3a of the pipe body 3 moves to the location of the checker diameter-expanding elastically-deformable claw 51. Therefore, as FIG. 28 illustrates, the annular projection 3a of the pipe body 3 expands the diameter of the checker diameter-expanding elastically-deformable claw 51. Then, the distal-end projections 51a and 51b of the checker diameter-expanding elastically-deformable claw 51 disengage from the location of the first engagement portion 45 of the retainer 41.

That is, the checker diameter-expanding elastically-deformable claw 51 is in a state capable of sliding downward without being engaged by the first engagement portion 45.

On the other hand, the checker-axis direction elastically-deformable claws 52 and 52 are in a state capable of flexibly deforming in the axial direction. As FIG. 27 illustrates, this is because the retainer diameter-expanding elastically-deformable claw 49 has restored its original shape, and thus is not positioned at a position sandwiching the checker-axis direction elastically-deformable claws 52 and 52. Then, the checker diameter-expanding elastically-deformable claw 51 and the checker-axis direction elastically-deformable claws 52 and 52 together are in a state capable of sliding in the downward direction (set radial direction). That is, the checker 50 is in the state capable of sliding toward the downward direction (set radial direction) with respect to the retainer 41 only after the retainer diameter-expanding elastically-deformable claw 49 is in the state surely engaged with the annular projection 3a of the pipe body 3.

(Third Intermediate State (Engagement Confirmation Intermediate Process))

Figure 29:
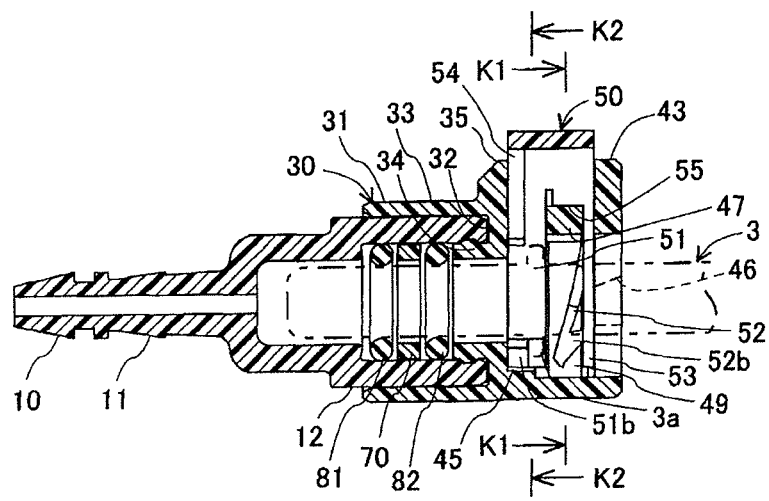
FIG. 29 (illustrating a third intermediate state) illustrates an axial cross-section view of the quick connector in a state in which the checker is slightly slid from the state of FIG. 26 toward a push-in direction with respect to the retainer. That is, a state in which the checker is positioned in the middle between the first position and a second position is illustrated. The pipe body is illustrated using a two-dot chain line only for an outer shape thereof.
Figure 30:
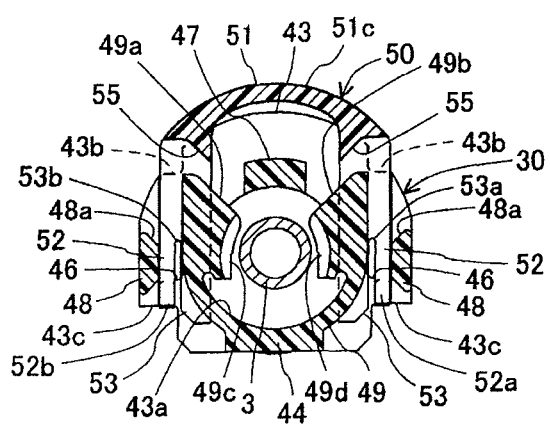
FIG. 30 (illustrating the third intermediate state) is a cross-section view along a line K1-K1 in FIG. 29, illustrating a state in which the retainer diameter-expanding elastically-deformable claw is not expanded diametrically.
Figure 31:
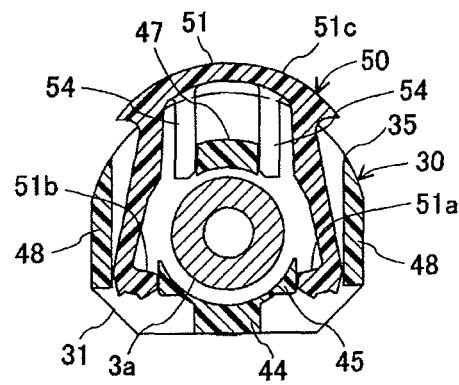
FIG. 31 (illustrating the third intermediate state) is a cross-section view along a line K2-K2 in FIG. 29, illustrating a state in which the checker diameter-expanding elastically-deformable claw is expanded diametrically.

Next, after the second intermediate state, the checker 50 is slid from the first position to the second position. The third intermediate state is a state in which the checker 50 is positioned in the middle between the first position and the second position. The third intermediate state is explained with reference to FIGS. 29-31. Here, in FIG. 29, in order for the state of the checker-axis direction elastically-deformable claws 52 and 52 to be easily understood, only an outer shape of the pipe body 3 is illustrated using a two-dot chain line. As FIGS. 29 and 30 illustrate, distal-end sides of the checker-axis direction elastically-deformable claws 52 and 52 are flexibly deformed. Further, as FIG. 31 illustrates, the checker diameter-expanding elastically-deformable claw 51 slides downward along lateral sides of the first engagement portion 45 of the retainer 41.

Further, when the checker 50 is slid in the push-in direction with respect to the retainer 41, the guide portion 47 of the retainer 41 and the guide portions 54 and 54 of the checker 50 regulate a relative rotation so as to guide the relative sliding movement in the push-in direction. This allows smoother sliding movement of the checker 50 in the push-in direction with respect to the retainer 41.

(Engagement Confirmation Completion State (Engagement Confirmation Process))

Figure 34:
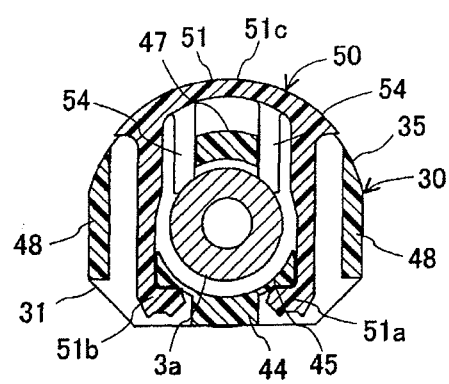
FIG. 34 (illustrating the engagement confirmation completion state) is a cross-section view along a line L2-L2 in FIG. 32, illustrating a state in which the checker diameter-expanding elastically-deformable claw is not expanded diametrically.

Next, the state in which the checker 50 is slid from the first position to the second position and arrives at the second position is explained with reference to FIGS. 32-34. As FIG. 34 illustrates, the checker diameter-expanding elastically-deformable claw 51 restores its original shape, and engages the lower surface of the distal-end side of the first engagement portion 45 of the retainer 41. That is, the checker diameter-expanding elastically-deformable claw 51 is regulated from sliding in a returning direction (upward direction) by being engaged by the first engagement portion 45.

Figure 32:
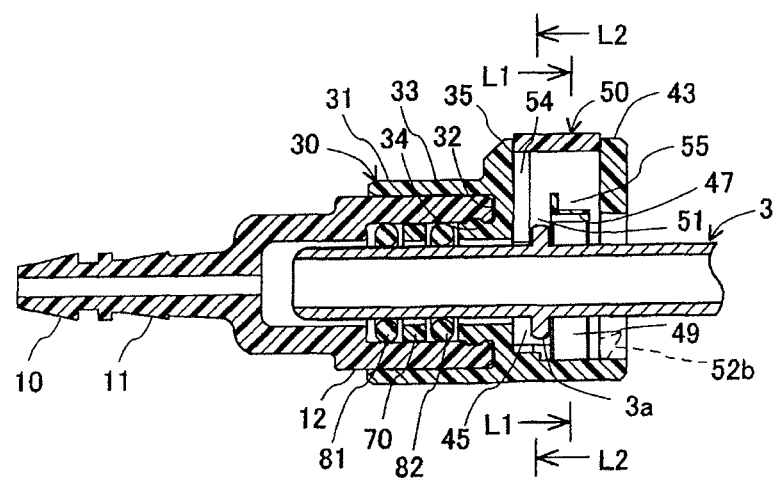
FIG. 32 (illustrating an engagement confirmation completion state) illustrates an axial cross-section view of the quick connector in a state in which the checker is positioned at the second position.

Further, as FIGS. 32 and 33 illustrate, the checker-axis direction elastically-deformable claws 52 and 52 are engaged by the lower cutouts 43c and 43c of the open end seat member 43 of the retainer 41. That is, the checker-axis direction elastically-deformable claws 52 and 52 are regulated from sliding in the returning direction (upward direction) by being engaged by the open end seat member 43.

Further, as FIG. 33 illustrates, the distal-end surfaces 49a and 49b of the retainer diameter-expanding elastically-deformable claw 49 are positioned below the release portions 55 and 55 of the checker 50. Therefore, in order for the checker 50 to further slide downward, the retainer diameter-expanding elastically-deformable claw 49 must be expanded diametrically. In order to diametrically expand the retainer diameter-expanding elastically-deformable claw 49, the checker 50 must be further pushed in. That is, when the checker 50 arrives at the second position, the checker 50 is in a state without being acted upon by any force, and is in an upwardly and downwardly engaged state with respect to the retainer 41.

As just described, by pushing the checker 50 into the retainer 41 to reach the second position, the operator can recognize that the pipe body 3 is in a state surely coupled to the quick connector 1. As explained in the above for the second intermediate state, at the point of the second intermediate state, the pipe body 3 is in a state of being surely coupled to the quick connector 1.

After the pipe body 3 is coupled to the quick connector 1, in order to withdraw the pipe body 3 from the quick connector 1, it is necessary to diametrically expand the retainer diameter-expanding elastically-deformable claw 49. When there is space to allow the retainer diameter-expanding elastically-deformable claw 49 to deform, a force for withdrawing the pipe body 3 is relatively small. In the present embodiment, the gap intervening members 53 and 53 have a function to fill the axial gaps between the retainer diameter-expanding elastically-deformable claw 49 and the open end seat member 43. This allows axial deformation of the retainer diameter-expanding elastically-deformable claw 49 to be inhibited. As a result, in the state in which the annular projection 3a of the pipe body 3 is engaged by the retainer diameter-expanding elastically-deformable claw 49, the force for withdrawing the pipe body 3 from the retainer 41 can be increased. Further, the slits 53a and 53b are provided between the gap intervening members 53 and 53 and the checker-axis direction elastically-deformable claws 52 and 52. Therefore, regardless of whether the elastic deformation of the gap intervening members 53 and 53 is regulated, the checker-axis direction elastically-deformable claws 52 and 52 are in an elastically-deformable state. Therefore, the above-described operation of the checker-axis direction elastically-deformable claws 52 and 52 can be realized.

(Release State (Release Process))

Figure 35:
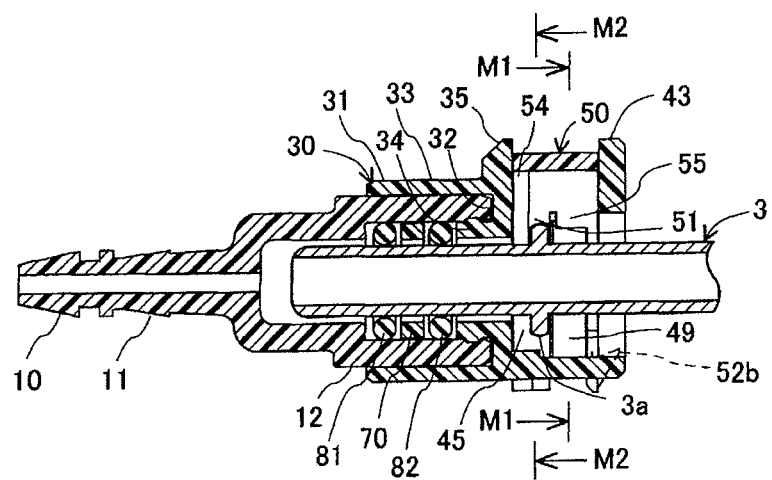
FIG. 35 (illustrating a release state) is an axial cross-section view of the quick connector in a state in which the checker is further pushed in from the second position to be positioned at a third position.
Figure 36:
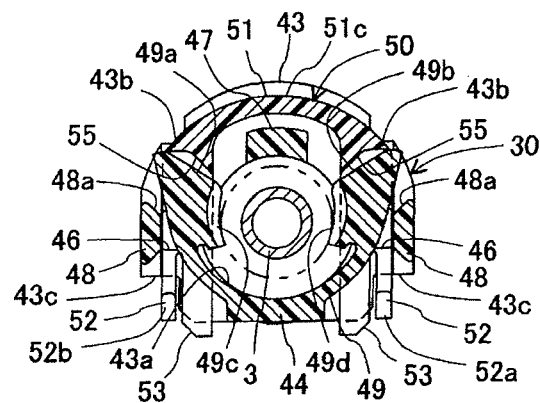
FIG. 36 (illustrating the release state) is a cross-section view along a line M1-M1 in FIG. 35, illustrating a state in which the retainer diameter-expanding elastically-deformable claw is expanded diametrically by a release member of the checker.
Figure 37:
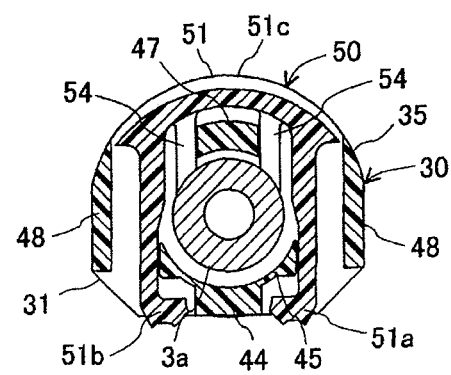
FIG. 37 (illustrating the release state) is a cross-section view along a line M2-M2 in FIG. 35, illustrating a state in which the checker diameter-expanding elastically-deformable claw is not expanded diametrically.

Next, a case may occur in which the pipe body 3 is withdrawn (released) from the quick connector 1, such as for maintenance and the like. This case is explained with reference to FIGS. 35-37. As FIGS. 35-37 illustrate, the checker 50 is slid from the second position with respect to the retainer 41 further in the push-in direction (downward). In this case, as FIG. 36 illustrates, the release portions 55 and 55 of the checker 50 diametrically expand the retainer diameter-expanding elastically-deformable claw 49. That is, to release, a force large enough to be able to diametrically expand the retainer diameter-expanding elastically-deformable claw 49 is required to push in the checker 50.

In this case, the release portions 55 and 55 of the checker 50 are formed in a shape corresponding to the slope shape of the distal-end surfaces 49a and 49b of the retainer diameter-expanding elastically-deformable 49. Therefore, by pushing the checker 50 into the retainer 41, the diameter of the retainer diameter-expanding elastically-deformable claw 49 can be expanded relatively easily. However, it is preferable that the force be larger than the force required for pushing in the checker 50 during engagement confirmation. This allows a release state to be prevented from occurring during engagement confirmation.

As just described, by diametrically expanding the retainer diameter-expanding elastically-deformable claw 49, engagement with the annular projection 3a of the pipe body 3 in the axial direction is released, and the pipe body 3 can be withdrawn from the quick connector 1. That is, the checker 50 can cause the retainer 41 to perform the release operation. As described above, the checker 50 performs engagement confirmation of the pipe body 3 and release of the pipe body 3. This allows the quick connector 1 as a whole to be simply configured without imposing complex features to the retainer 41.

(Second Embodiment)

Next, a quick connector according to a second embodiment will be described. The quick connector according to the second embodiment has a second housing and a checker that are different from the quick connector according to the first embodiment. Further, an engagement confirmation state and transition from the engagement confirmation state to a release state are different from the first embodiment. In the following, the differences are explained. Incidentally, elements that are the same as in the first embodiment are denoted by the same reference numerals, and the explanation thereof is omitted.

(Detailed Configuration of the Second Housing)

Figure 38:
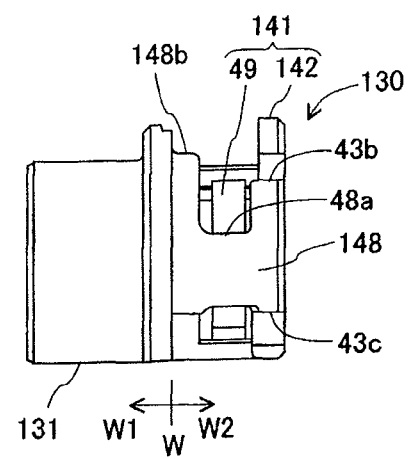
FIG. 38 is a front view (diagram viewed from a direction perpendicular to the axis) of a second housing configuring a quick connector according to a second embodiment.

The detailed configuration of a second housing 130 will be explained with reference to FIGS. 38-46. The second housing 130 is configured to include a housing body 131 and a retainer 141. Since the housing body 131 and the retainer 141 are integrally formed, there is not a strict boundary. However, in the explanation here, an axial location W in FIG. 38 is used as a boundary. The housing body 131 is provided as a portion W1 on a left side (one axial side) of the axial location W in FIG. 38 and the retainer 141 is provided as a portion W2 on a right side (other axial side) of the axial location W in FIG. 38.

Figure 39:
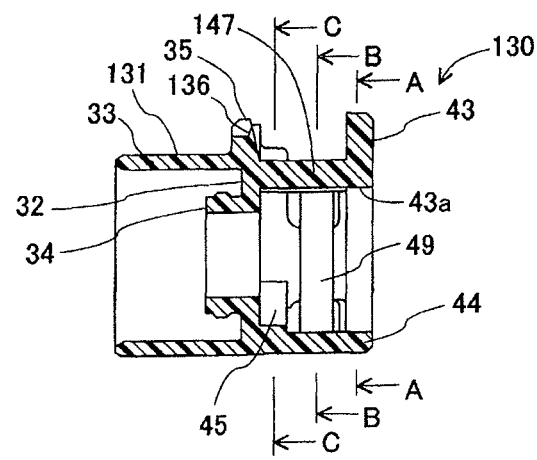
FIG. 39 is an axial cross-section view of the second housing in FIG. 38.
Figure 40:
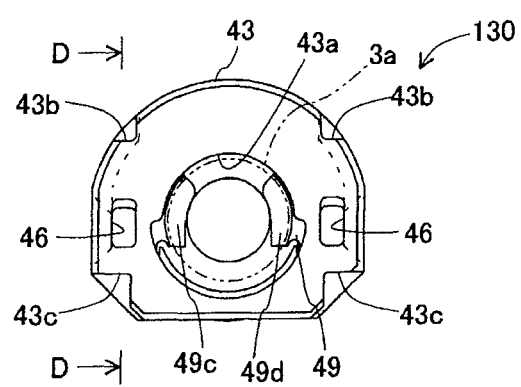
FIG. 40 is a right side view in FIG. 38.
Figure 41:
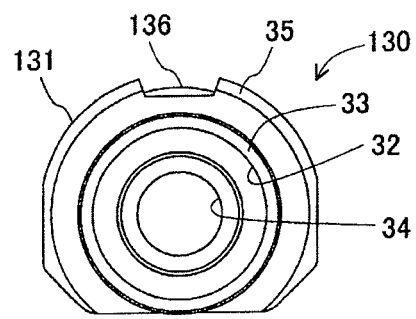
FIG. 41 is a left side view in FIG. 38.
Figure 42:
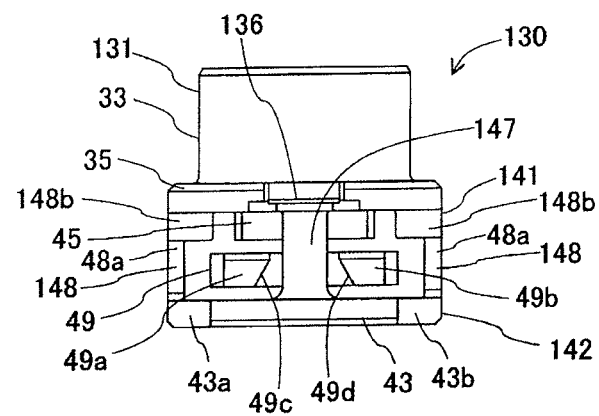
FIG. 42 is diagram (plain view) viewed from above in FIG. 40.
Figure 43:
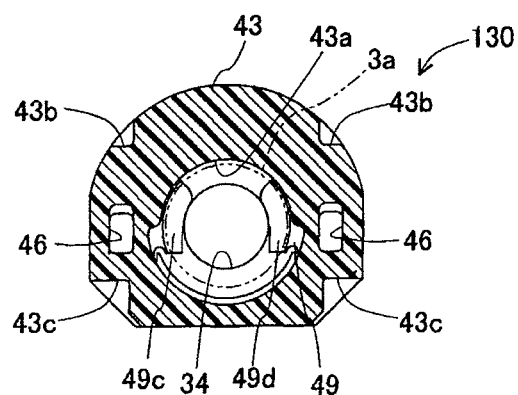
FIG. 43 is a cross-section view along a line A-A in FIG. 39.
Figure 44:
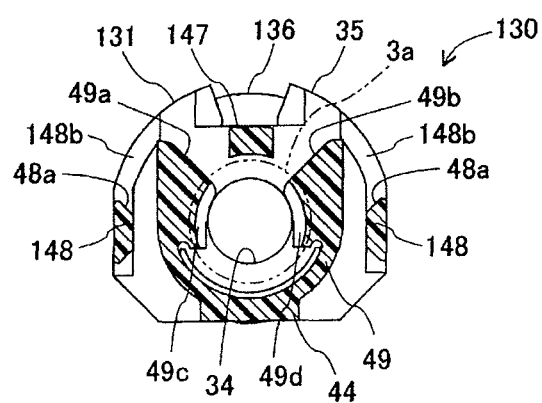
FIG. 44 is a cross-section view along a line B-B in FIG. 39.
Figure 45:
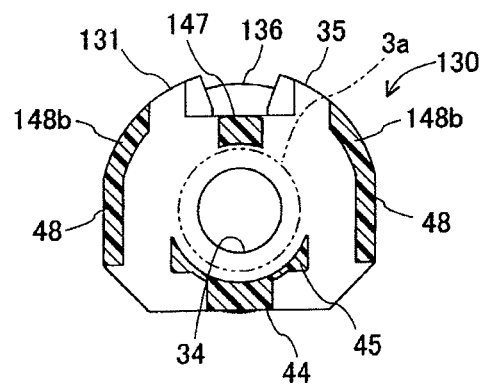
FIG. 45 is a cross-section view along a line C-C in FIG. 39.
Figure 46:
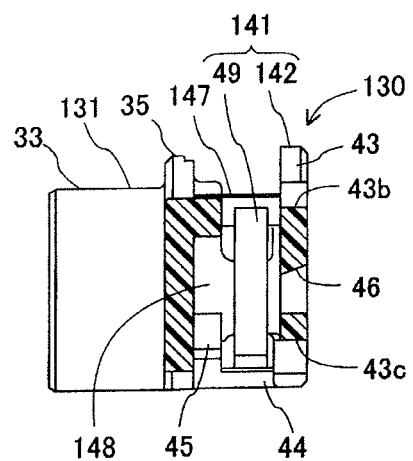
FIG. 46 is a cross-section view along a line D-D in FIG. 40.
Figure 47:
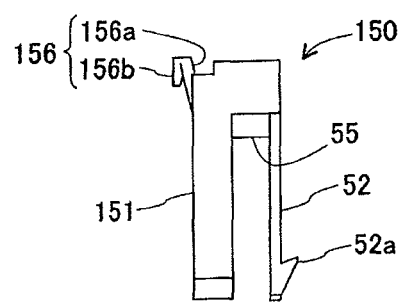
FIG. 47 is a front view (diagram viewed from a direction perpendicular to the axis) of a checker configuring the quick connector according to the second embodiment.
Figure 48:
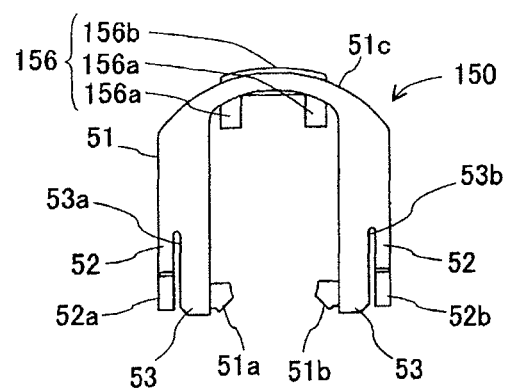
FIG. 48 is a right side view in FIG. 47.
Figure 49:
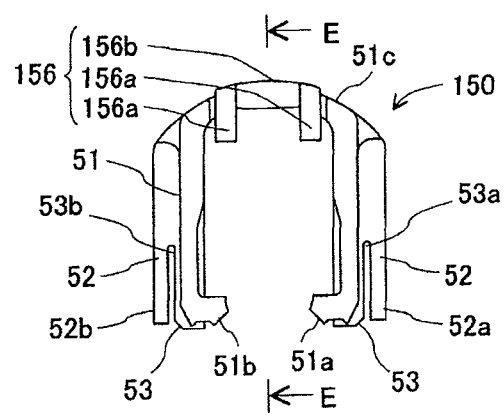
FIG. 49 is a left side view in FIG. 47.
Figure 50:
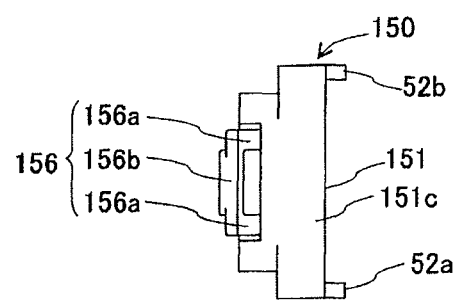
FIG. 50 is diagram (plain view) viewed from above in FIG. 47.
Figure 51:
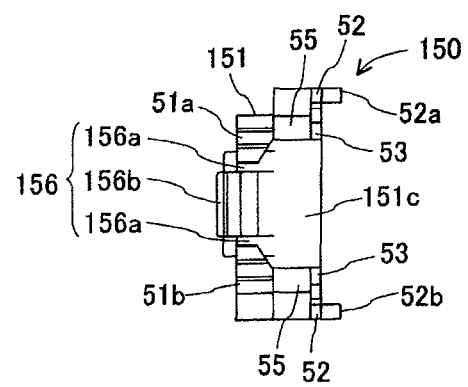
FIG. 51 is diagram (bottom view) viewed from below in FIG. 47.

As FIG. 39 illustrates, the housing body 131 is different from the housing body 31 according to the first embodiment in that a third engagement portion 136 is formed at a place of the flange 35 where a cutout is formed at an upper portion in FIGS. 44 and 45. As FIG. 39 illustrates, the third engagement portion 136 is formed projecting upward in the drawing forming a shape of an acute angle. That is, a normal direction of an inclined surface of the third engagement portion 136 on the right side in FIG. 39 is a direction combining a component (upward direction component in FIG. 39) of a direction opposite to the push-in direction of a checker 150 and a component (rightward direction component in FIG. 39) of the axial direction on the retainer 141 side. Further, a normal direction of an inclined surface of the third engagement portion 136 on the left side in FIG. 39 is a direction combining a component (upward direction component in FIG. 39) of the direction opposite to the push-in direction of the checker 150 and a component (leftward direction component in FIG. 39) of the axial direction on the opposite side of the retainer 141 side.

The retainer 141 is configured to include a retainer body 142 and the retainer diameter-expanding elastically-deformable claw 49. The retainer body 142 is integrally formed with the housing body 131. The retainer body 142 includes the open end seat member 43, the lower joining member 44, the first engagement portion 45, the second engagement portion 46, a joining portion 147, and stopper guides 148. This is the same configuration as the retainer body 142 according to the first embodiment except the joining portion 147 and the stopper guide 148.

As FIGS. 39, 42, 44 and 45 illustrate, the joining portion 147 joins a portion slightly below the third engagement portion 136 of the flange 35 of the housing body 131 and the upper side of the open end seat member 43. The joining portion 147 is provided at a location that does not interfere with the annular projection 3a of the pipe body 3 indicated by the two-dot chain line in FIG. 45.

As FIG. 38 illustrates, on the pair of the stopper guides 148, guide portions 148b extend upward, which are provided on the left side of the cutouts 48a in the drawing (the housing body 131 side), with respect to the stoppers 48 according to the first embodiment. As FIG. 45 illustrates, each of the guide portions 148b is formed along the outer periphery of the flange 35. Opposing sides of the pair of the guide portions 148b guide lateral sides of a checker diameter-expanding elastically-deformable claw 151 of the checker 150, which will be described later.

(Detailed Configuration of the Checker)

Next, a detailed configuration of the checker 150 will be described with reference to FIGS. 47-52. The checker 150 is different from the checker 50 according to the first embodiment mainly in that a release elastically-deformable claw 156 is provided and in that the guide portion 54 is eliminated. The checker 150 in configured to include a checker diameter-expanding elastically-deformable claw 151, the checker-axis direction elastically-deformable claw 52, the gap intervening member 53, the release portion 55, and the release elastically-deformable claw 156. A base portion 151c of the checker diameter-expanding elastically-deformable claw 151 is formed eliminating portions protruding toward the left and right sides in FIG. 49.

Figure 52:
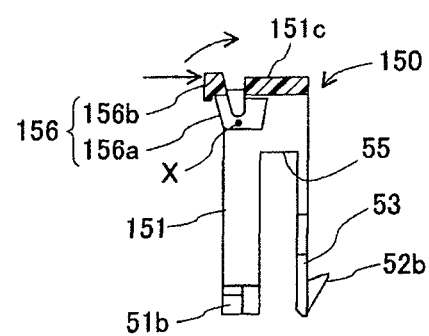
FIG. 52 is a cross-section view along a line E-E in FIG. 49.

As FIG. 52 illustrates, the release elastically-deformable claw 156 includes a pair of arm portions 156a forming a U-shaped axial cross-sectional shape from the base portion 151c to the housing body 131 side. The opening side of the U-shape of the arm portions 156a is the upper side in FIG. 52. That is, when the pair of the arm portions 156a are acted by an axial force from the housing body 131 side, the portion on the housing body 131 side elastically deforms in a direction of rotation (clockwise in FIG. 52) centered on a support point X (center of a curved portion of the U-shape, which is a location at a base side of the release elastically-deformable claw 156) illustrated in FIG. 52. Further, a surface of the pair of arm portions 156a on the housing body 131 side is a sloped surface, and a normal direction of the sloped surface is a direction combining a component (downward direction component in FIG. 52) of the push-in direction of the checker 150 and a component (leftward direction component in FIG. 39) of the axial direction on the housing body 131 side.

On the distal-end side of the pair of the arm portions 156a, a claw portion 156b is integrally formed. That is, the claw portion 156b connects the pair of arm portions 156a. Therefore, when a force is applied to the claw portion 156b in the rightward direction in FIG. 52, along with the elastic deformation in the direction of rotation of the pair of the arm portions 156a, the claw portion 156b moves toward upper-right side in FIG. 52.

A surface of the claw portion 156b on the pair of arm portions 156a side is a sloped surface, and a normal direction of the sloped surface is a direction combining a component (downward direction component in FIG. 52) of the push-in direction of the checker 150 and a component (rightward direction component in FIG. 39) of the axial direction on the opposite side of the housing body 131. That is, the sloped surface of the pair of the arm portions 156a and the sloped surface of the claw portion 156b form an inner surface in a shape of an acute angle.

(Engagement Confirmation Completion State (Engagement Confirmation Process))

Figure 53:
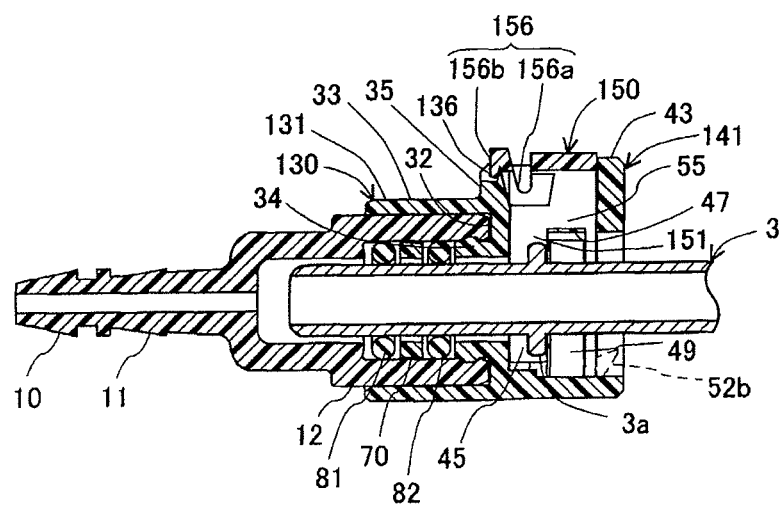
FIG. 53 (illustrating the engagement confirmation completion state) illustrates an axial cross-section view of the quick connector in a state in which the checker is positioned at the second position.

Next, the state in which the checker 150 is slid from the first position toward the second position and arrives at the second position is explained with reference to FIG. 53. This corresponds to the state illustrated by FIGS. 32-35 in the first embodiment. As FIG. 53 illustrates, the claw portion 156b of the release elastically-deformable claw 156 engages the third engagement portion 136 in the push-in direction of the checker 150. That is, in the state in which the checker 150 is positioned at the second position, the release elastically-deformable claw 156 and the third engagement portion 136 regulate the checker 150 from sliding toward the third position (position further in the push-in direction).

(Release State (Release Process))

Figure 54:
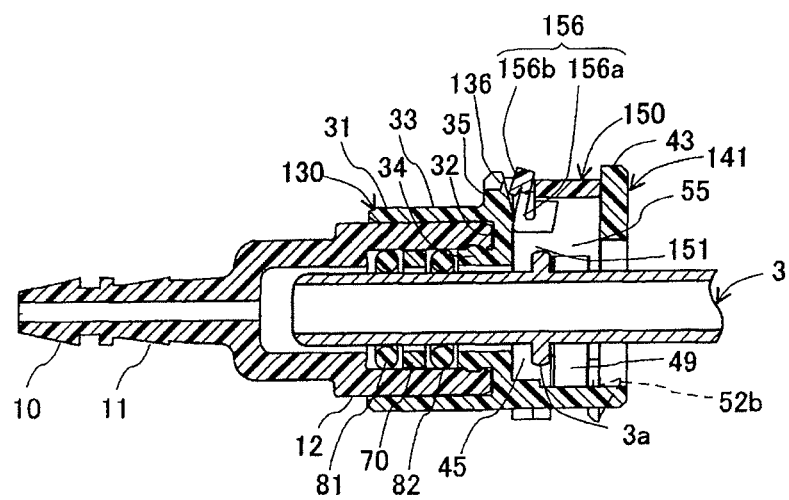
FIG. 54 (illustrating the release state) is an axial cross-section view of the quick connector in a state in which the checker is further pushed in from the second position to be positioned at the third position.

Next, the release process will be described with reference to FIGS. 53 and 54. First, in the engagement confirmation completion state illustrated in FIG. 53, a force is applied to the claw portion 156b in the rightward axial direction in FIG. 53. Then, as FIG. 54 illustrates, the pair of the arm portions 156a elastically deform in such a way as to rotate in the clockwise direction in FIG. 54. By the elastic deformation, the engagement with the third engagement portion 136 by the release elastically-deformable claw 156 is released. Then, the checker 150 is further slidable with respect to the retainer 141 from the second position in the push-in direction (downward).

While the release elastically-deformable claw 156 maintains the above state, the checker 150 is further slid with respect to the retainer 141 in the push-in direction (downward). In this case, as explained in the first embodiment, the release portions 55 and 55 of the checker 150 expand the diameter of the retainer diameter-expanding elastically-deformable claw 49. As a result, the engagement with the annular projection 3a of the pipe body 3 in the axial direction is released, so that the pipe body 3 can be withdrawn from the quick connector 1.

Here, in the first embodiment, when an operator accidentally applied a force pushing in the checker 50 from the second position further in the push-in direction (downward), the pipe body 3 may be put in the release state. However, as FIG. 53 illustrates, in the engagement confirmation position, the release elastically-deformable claw 156 engages with the third engagement portion 136. Thereby, without releasing the engagement by the release elastically-deformable claw 156 with the third engagement portion 136, the checker 150 cannot slide to the third position (release position). That is, interference due to surrounding parts and accidentally sliding the checker 150 to the third position (release position) by an operator can be prevented. Further, the third engagement portion 136 is provided on the housing body 131, and the release elastically-deformable claw 156 is provided on the checker 150. Thereby, the above effect can be achieved without adding new components.

Figure 55:
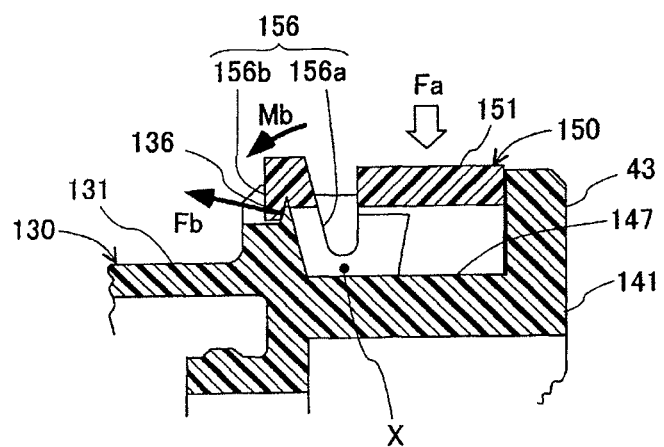
FIG. 55 is an enlarged view of a pair of arm portions and a portion of a third engagement portion.

Here, with reference to FIG. 55, the engagement state between the release elastically-deformable claw 156 and the third engagement portion 136 will be described in detail. As FIG. 55 illustrates, the site of the release elastically-deformable claw 156 that is in contact with the third engagement portion 136 is in a planar shape inclined with respect to the push-in direction of the checker 150. Therefore, in the state illustrated in FIG. 55, when a force Fa in the push-in direction (downward) is applied to the checker 150, an engagement force that the release elastically-deformable claw 156 receives from the third engagement portion 136 is Fb. The support point of the elastic deformation of the pair of the arm portions 156a of the release elastically-deformable claw 156 is X. Then, a moment generated by the engagement force Fb on the pair of arm portions 156a is Mb.

The rotational direction of this moment Mb is opposite to the rotational direction illustrated in FIG. 54 for releasing the engagement of the release elastically-deformable claw 156 with the third engagement portion 136. Therefore, as FIG. 53 illustrates, in the state in which the release elastically-deformable claw 156 engages with the third engagement portion 136, even when a force is applied to push the checker 150 further in the push-in direction (downward), the release elastically-deformable claw 156 can be prevented from elastically deforming in such a way as to be released from the engagement with the third engagement portion 136. Therefore, interference due to surrounding parts and accidentally sliding the checker 150 to the third position (release position) by an operator can be surely prevented.

[Description of Reference Numerals]

1: quick connector
3: pipe body
3a: annular projection
10: first housing
11: tube connecting portion
12: pipe insertion portion
30, 130: second housing
31, 131: housing body
32: groove
33: outer periphery cylindrical portion
34: inner periphery cylindrical portion
35: flange
136: third engagement portion
41, 141: retainer
42, 142: retainer body
43: open end seat member
43a: central hole
43b: upper cutout
43c: lower cutout
44: lower joining member
45: first engagement portion
46: second engagement portion
47: guide portion
48: stopper
48a: cutout
49: retainer diameter-expanding elastically-deformable claw
49a, 49b: distal-end surface
49c, 49d: end surface
147: joining portion
148: stopper guide
148b: guide portion
50, 150: checker
51: checker diameter-expanding elastically-deformable claw
51a, 51b: distal-end projection
51c: base portion
52: checker-axis direction elastically-deformable claw
52a, 52b: distal-end projection
53: gap intervening member
53a, 53b: slit
54: guide portion
55: release portion
156: release elastically-deformable claw
156a: arm portion
156b: claw portion
70: collar
81, 82: annular seal member

What is claimed is:

1. A quick connector coupling to a cylindrical pipe body having an annular projection formed projecting radially outward at a location axially spaced from a distal end, comprising:
 a cylindrical housing body;
 a retainer integrally formed with or coupled to the housing body, having a shape capable of allowing the pipe body to be inserted therethrough in an axial direction from an opening end of the retainer, and engaging the annular projection of the pipe body inserted into the retainer from the opening end in the axial direction to regulate disengagement of the pipe body in the axial direction; and a checker confirming that the annular projection of the pipe body is in a state of being engaged by the retainer by sliding in a set radial direction with respect to the retainer to move from a first position to a second position, the retainer comprising:
- a retainer body having a first engagement portion and a second engagement portion; and
- a retainer diameter-expanding elastically-deformable claw provided on the retainer body, having a C-shape capable of expanding diametrically by elastic deformation, allowing the annular projection of the pipe body to pass through in the axial direction by expanding diametrically, and engaging with the annular projection in the axial direction by restoring an original shape after the annular projection of the pipe body has passed through in the axial direction, the checker comprising:
- a checker diameter-expanding elastically-deformable claw formed in a C-shape capable of expanding diametrically by elastic deformation, preventing sliding with respect to the retainer body from the first position toward the set radial direction by being engaged by the first engagement portion in a not diameter-expanded state, being expanded diametrically by the annular projection of the pipe body after which has passed through the retainer diameter-expanding elastically-deformable claw in the axial direction, and capable of sliding with respect to the retainer body from the first position toward the second position in the set radial direction by being released from the engagement with the first engagement portion in a diameter-expanded state; and
- a checker-axis direction elastically-deformable claw having a distal-end side formed flexibly deformable in the axial direction, maintaining a state of being engaged by the second engagement portion of the retainer body by having the deflective deformation prevented by the retainer diameter-expanding elastically-deformable claw in a state in which the retainer diameter-expanding elastically-deformable claw is expanded diametrically, preventing sliding with respect to the retainer body from the first position toward the set radial direction by being engaged by the second engagement portion of the retainer body, and capable of sliding with respect to the retainer body from the first position to the second position in the set radial direction by being capable of being released from the engagement with the second engagement portion of the retainer body in a state in which the retainer diameter-expanding elastically-deformable claw has restored its original shape, wherein the set radial direction along which the checker slides with respect to the retainer from the first position to the second position is a push-in direction of the checker with respect to the retainer;

an opening side of the C-shape of the retainer diameter-expanding elastically-deformable claw is in a direction opposite to the push-in direction; and the checker has a release portion diametrically expanding the retainer diameter-expanding elastically-deformable claw by sliding with respect to the retainer from the second position to a third position in the set radial direction.

2. The quick connector according to claim 1, comprising a release regulator regulating sliding of the checker toward the third position with respect to the retainer body in a state in which the checker is positioned at the second position with respect to the retainer body, and allowing the checker to be slidable with respect to the retainer body toward the third position when a force is applied.

3. The quick connector according to claim 1, wherein
the retainer is integrally formed with the housing body; and
the retainer comprises a stopper regulating diameter expansion of the retainer diameter-expanding elastically-deformable claw when amount of diameter expansion of the retainer diameter-expanding elastically-deformable claw has reached a set amount.

4. The quick connector according to claim 1, wherein
the retainer body comprises an open end seat member forming an opening end of the retainer and forming the second engagement portion; and
the checker comprises a gap intervening member formed on a radially inner side of the checker-axis direction elastically-deformable claw with a slit intervening therebetween, intervening in an axial gap between the open end seat member of the retainer body and the retainer diameter-expanding elastically-deformable claw during a period when the checker moves from the first position to the second position with respect to the retainer.

5. The quick connector according to claim 1, wherein the retainer and the checker comprise a guide regulating a relative rotation and guiding relative sliding in the set radial direction.

6. The quick connector according to claim 1, wherein the checker-axis direction elastically-deformable claw comprises a pair of checker-axis direction elastically-deformable claws respectively corresponding to two ends of the retainer diameter-expanding elastically-deformable claw.

* * * * *